US006049886A

United States Patent [19]

Motoyama

[11] Patent Number: 6,049,886

[45] Date of Patent: Apr. 11, 2000

[54] CLOCK FREQUENCY SYNCHRONIZER

[75] Inventor: Hideyuki Motoyama, Kawasaki, Japan

[73] Assignee: Fujitsu Limited, Kanagawa, Japan

[21] Appl. No.: 09/078,252

[22] Filed: May 13, 1998

[30] Foreign Application Priority Data

Oct. 29, 1997 [JP] Japan .................................... 9-296801

[51] Int. Cl.[7] ........................................................ G06F 1/12

[52] U.S. Cl. ............................................ 713/400; 713/503

[58] Field of Search .................................... 713/400, 401, 713/500, 501, 502, 503, 600

[56] References Cited

U.S. PATENT DOCUMENTS

| | | | |
|---|---|---|---|
| 5,640,388 | 6/1997 | Woodhead et al. | 370/468 |
| 5,726,989 | 3/1998 | Dokic | 370/509 |
| 5,740,307 | 4/1998 | Lane | 386/68 |
| 5,874,995 | 2/1999 | Naimpally et al. | 348/384 |
| 5,881,114 | 3/1999 | Moon | 375/376 |
| 5,901,149 | 5/1999 | Itakura et al. | 370/468 |
| 5,966,387 | 10/1999 | Cloutier | 370/516 |

*Primary Examiner*—Dennis M. Butler
*Attorney, Agent, or Firm*—Helfgott & Karas, PC.

[57] ABSTRACT

Disclosed is a clock frequency synchronizer which receives a count value of system clock on an encoder side which is transmitted from the encoder as a reference count value, and generates system clock on a decoder side which is synchronous in frequency with the system clock on the encoder side on the basis of the reference count value. A counting means for counting the system clocks on the decoder side is provided, and the deviation of the frequency of the system clock on the decoder side from that of the system clock on the encoder side is obtained by using an increment ΔC of the count value of the counting means during reference count value arrival interval ΔT and the increment ΔP of the reference count value. The frequency of the system clock on the decoder side is so controlled that the frequency deviation becomes zero.

12 Claims, 17 Drawing Sheets

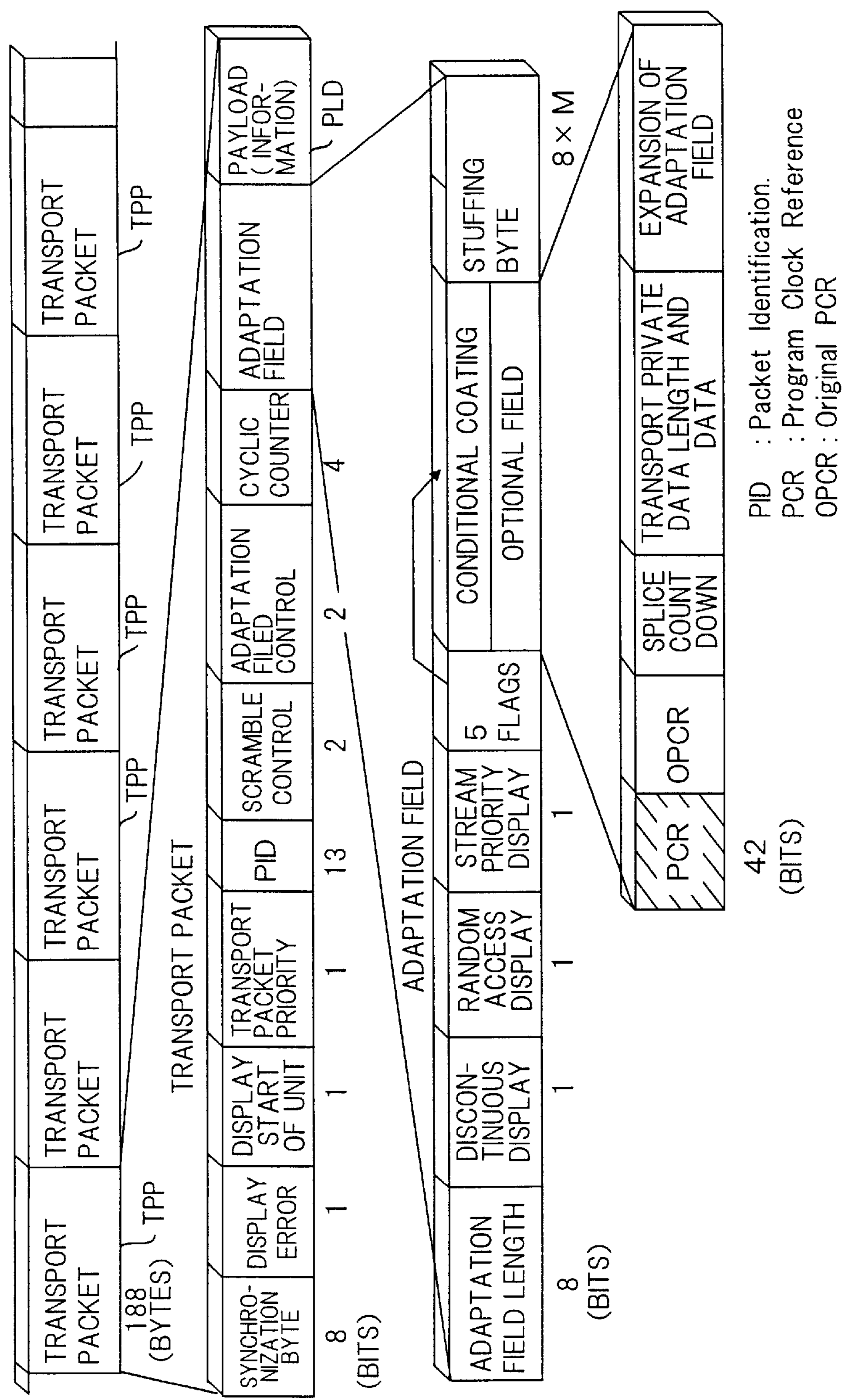

FIG.2
TRANSPORT PACKET
TPP
188 (BYTES)
TRANSPORT PACKET
SYNCHRO-NIZATION BYTE
DISPLAY ERROR
DISPLAY START OF UNIT
TRANSPORT PACKET PRIORITY
PID
SCRAMBLE CONTROL
ADAPTATION FILED CONTROL
CYCLIC COUNTER
ADAPTATION FIELD
PAYLOAD (INFOR-MATION)
PLD
8 (BITS)
1
1
1
13
2
2
4
ADAPTATION FIELD
ADAPTATION FIELD LENGTH
DISCON-TINUOUS DISPLAY
RANDOM ACCESS DISPLAY
STREAM PRIORITY DISPLAY
5 FLAGS
CONDITIONAL COATING
OPTIONAL FIELD
STUFFING BYTE
8 (BITS)
1
1
1
8 × M
PCR
OPCR
SPLICE COUNT DOWN
TRANSPORT PRIVATE DATA LENGTH AND DATA
EXPANSION OF ADAPTATION FIELD
42 (BITS)
PID : Packet Identification.
PCR : Program Clock Reference
OPCR : Original PCR 27MHz OUTPUT
INTERNAL COUNTER
CPU BUS
73
21e
53
56
Base (33bit)
Reg
Reg
27MHz VCXO
B
C
57
Ext (9bit)
61
62
52
Reg
D/A
AMP
Reset
Latch2
PCR STORAGE PORTION
58
60
51
PCR VALUE FROM MPEG2 SYSTEM DECODER
Base (33bit)
55
Reg
PULSE GENERATOR
Reg
A
Ext (9bit)
Reset
Latch
Start
Pulse
54
59
PCR ARRIVAL END SIGNAL
OPERATION CONTROLLER
Reg
71
IRQ
CPU CLOCK
72
CPU · Start
· Reset
· Pulse
· Latch2
· COUNT VALUE(B)
· COUNT VALUE(C)
RESET COUNTER VALUE OF INTERNAL COUNTER
( E.G., 100 ms )
" 0 " CLEAR
COUNT FROM " 0 "
COUNT VALUE DURING 100 ms

FIG.6

| | REGISTER NAME | 15 | 14 | 13 | 12 | 11 | 10 | 9 | 8 | 7 | 6 | 5 | 4 | 3 | 2 | 1 | 0 | DIRECTION OF ACCESS |
|---|---|---|---|---|---|---|---|---|---|---|---|---|---|---|---|---|---|---|
| 55 | PCR2 | UNUSED | | | | | | PCR_Base[32...23] | | | | | | | | | | R |
| | PCR1 | PCR_Base[22...7] | | | | | | | | | | | | | | | | R |
| | PCR0 | PCR_Base[6...0] | | | | | | | PCR_Ext[8...0] | | | | | | | | | R |
| 53 | CNT2 | UNUSED | | | | | | COUNT_Base[32...23] | | | | | | | | | | R |
| | CNT1 | COUNT_Base[22...7] | | | | | | | | | | | | | | | | R |
| | CNT0 | COUNT_Base[6...0] | | | | | | | COUNT_Ext[8...0] | | | | | | | | | R |
| 57 | VCXO | UNUSED | | | | | | | | VCXO[7...0] | | | | | | | | RW |
| 58 | CHECK | Pulse_Start | UNUSED | | | | | | | | | | | | | | | W |
| | | | UNUSED | | | | | | | | | | | | | | | R |
| 59 | IRQ | Pcr_IRQ | UNUSED | | | | | | | | | | | | | | | R |

FIG. 7

| VCXO[7...0] | 0×FF | | 0×81 | 0×80 | 0×7F | 0×7E | | 0×00 |
|---|---|---|---|---|---|---|---|---|
| FREQUENCY CORRECTING VALUE | +127ppm | | +1ppm | 0ppm | −1ppm | −2ppm | | −128ppm |

(E. G., FREQUENCY SETTING VALUE WITH RESPECT TO A FREQUENCY OF 27.0 MHz WHEN REGISTER HAS 8 BITS)

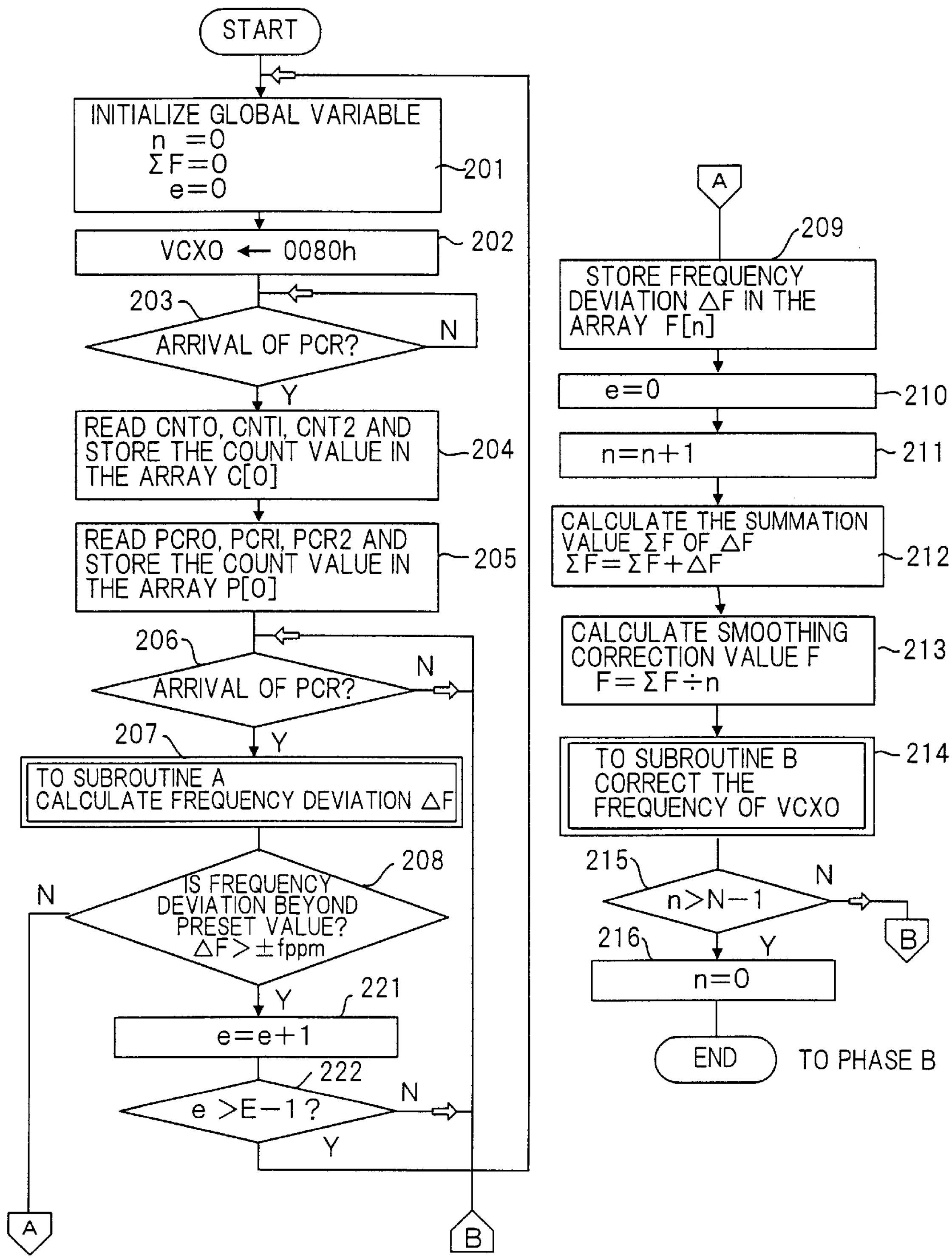

FIG. 10
START
INITIALIZE GLOBAL VARIABLE
n =0
ΣF=0
e=0
201
VCXO ← 0080h
202
203
ARRIVAL OF PCR?
N
Y
READ CNT0, CNT1, CNT2 AND STORE THE COUNT VALUE IN THE ARRAY C[0]
204
READ PCR0, PCR1, PCR2 AND STORE THE COUNT VALUE IN THE ARRAY P[0]
205
206
ARRIVAL OF PCR?
N
207
Y
TO SUBROUTINE A
CALCULATE FREQUENCY DEVIATION ΔF
208
IS FREQUENCY DEVIATION BEYOND PRESET VALUE? ΔF>±fppm
N
Y
221
e=e+1
222
e >E−1 ?
N
Y
A
B
A
209
STORE FREQUENCY DEVIATION ΔF IN THE ARRAY F[n]
e=0
210
n=n+1
211
CALCULATE THE SUMMATION VALUE ΣF OF ΔF
ΣF=ΣF+ΔF
212
CALCULATE SMOOTHING CORRECTION VALUE F
F=ΣF÷n
213
TO SUBROUTINE B
CORRECT THE FREQUENCY OF VCXO
214
215
n>N−1
N
B
216
Y
n=0
END
TO PHASE B

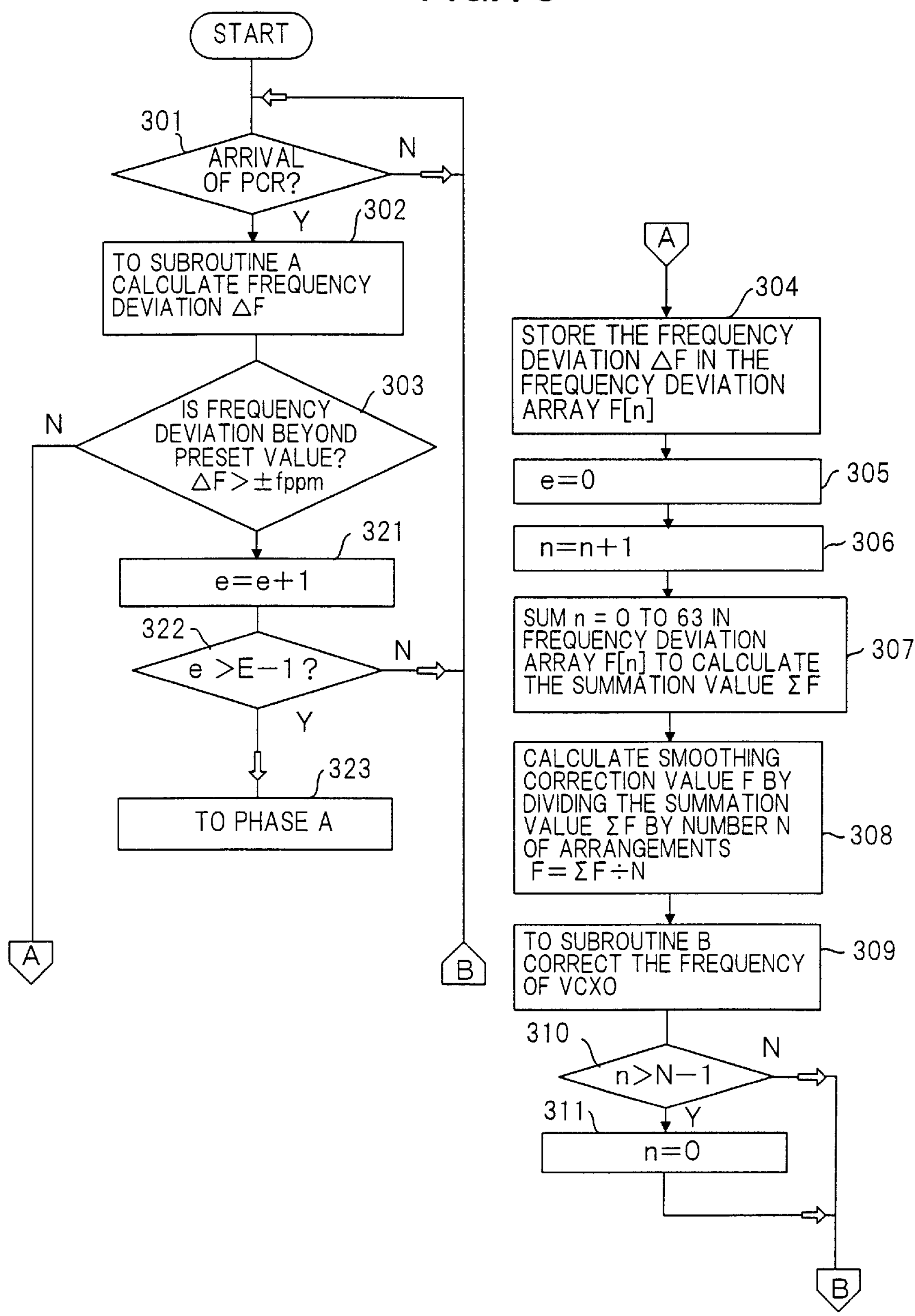
FIG. 13
START
301
ARRIVAL OF PCR?
N
Y
302
TO SUBROUTINE A CALCULATE FREQUENCY DEVIATION ΔF
303
IS FREQUENCY DEVIATION BEYOND PRESET VALUE? ΔF>±fppm
N
321
e=e+1
322
e >E−1 ?
N
Y
323
TO PHASE A
A
B
A
304
STORE THE FREQUENCY DEVIATION ΔF IN THE FREQUENCY DEVIATION ARRAY F[n]
e=0
305
n=n+1
306
SUM n = 0 TO 63 IN FREQUENCY DEVIATION ARRAY F[n] TO CALCULATE THE SUMMATION VALUE ΣF
307
CALCULATE SMOOTHING CORRECTION VALUE F BY DIVIDING THE SUMMATION VALUE ΣF BY NUMBER N OF ARRANGEMENTS F=ΣF÷N
308
TO SUBROUTINE B CORRECT THE FREQUENCY OF VCXO
309
310
n>N−1
N
311
Y
n=0
B TPP TRANSPORT PACKET
PAYLOAD PLD
IFL
TPP
PCR
PCR VALUE
0
1
2
3
4
5
6
7
8
9
35
36
37
38
39
40
41
PCR ARRIVAL END SIGNAL
Latch
INTERRUPTION (IRQ)
STORE AT THIS TIMING
GENERATE INTERRUPTION SIGNAL AT THIS TIMING ARRIVAL OF PCR
(1)
ARRIVAL OF PCR
(2)
ARRIVAL OF PCR
(3)
ARRIVAL OF PCR
(4)
ARRIVAL OF PCR
(5)
SYSTEM CLOCK OF ENCODER
SYSTEM CLOCK OF DECODER
FREQUENCY DEVIATION ΔF
NOT CONVERGED HEREAFTER

CLOCK FREQUENCY SYNCHRONIZER

BACKGROUND OF THE INVENTION

The present invention relates to a clock frequency synchronizer on a decoder side and, more particularly, to a clock frequency synchronizer for receiving a count value of system clock on an encoder side which is transferred from the encoder as a reference count value, and generating system clock on the decoder side which is synchronous in frequency with the system clock on the encoder side on the basis of the reference count value.

There is a data multiplexing transmission system called a transport stream (MPEG2-TS) in the ISO/IEC MPEG2 system. In a picture transmitting system for multiplexing and transmitting picture, sound, data, etc through a network by using such a transport stream (MPEG2-TS), it is necessary for the decoder side to reproduce the system clock which is synchronous in frequency with the system clock (27 MHz) for encoding a picture used on the encoder side.

For this purpose, in the MPEG2-TS, the encoder inserts a PCR (Program Clock Reference) value into each transport packet TPP composed of 188 bytes before transmission, and the decoder extracts the PCR value and generates a system clock on the decoder side which is synchronous in frequency with the system clock on the encoder side on the basis of the PCR value, as shown in FIG. 14. The PCR value is a count value obtained by counting the system clocks on the encoder side in a packet transmission period, and it is represented by 42 bits. The transport packet TPP is composed of an information field portion IFL into which various control information is inserted and a payload PLD for transmitting data. A PCR value of 42 bits is inserted into a predetermined place of the information field portion IFL.

The decoder is provided with a system clock generator for generating a system clock, an internal counter for counting the system clocks, and an arithmetic processor. The arithmetic processor obtains the number ΔB of system clocks counted by the internal counter during the period between the arrival of the precedent PCR value and the arrival of the current PCR value, and the difference ΔA between the precedent PCR value and the current PCR value. The difference ΔA between the precedent PCR value and the current PCR value is an increment in the number of system clocks on the encoder side. Therefore, the value obtained by dividing the difference between ΔA and ΔB by the PCR arrival interval ΔT is a frequency deviation of the system clock on the decoder side from the frequency of the system clock on the encoder side. The arithmetic processor obtains the frequency deviation by dividing the difference between ΔB and ΔA by ΔT, and controls the oscillation frequency of the system clock generator on the decoder side so that the frequency deviation becomes zero. In this manner, the synchronism of the frequencies of the system clocks on the encoder side and the decoder side is established.

FIG. 15 shows the structure of a clock frequency synchronizing circuit in a conventional decoder. In FIG. 15, the reference numeral 1 represents a reference PCR storage portion for storing the PCR value of 42 bits which is transmitted from the encoder of an MPEG2 system separator (not shown). The reference PCR storage portion 1 is composed of a Base portion of 33 bits and an extension portion of 9 bits, i.e, 42 bits in total. The reference numeral 2 represents an internal counter for counting the system clocks of the decoder. The internal counter 2 is composed of a Base portion of 33 bits and an extension portion of 9 bits, i.e, 42 bits in total. The Extension portion counts from 0 to 299 and the Base portion counts up the carry pulses supplied from the Extension portion. An internal counter 2 is capable of counting the system clocks of 27 MHz for a little over 24 hours. The reference numeral 3 represents an operation controller, which receives a PCR arrival end signal from the MPEG2 system separator and generates a latch signal Latch and an interruption signal IRQ, as shown in FIG. 14. That is, the operation controller 3 (1) executes control for generating a latch signal Latch when the arrival of a PCR value from the encoder has ended so as to latch the reference PCR value to the reference PCR storage portion 1, and (2) control for generating an interruption signal IRQ when the arrival of a PCR value has ended.

The reference numeral 4 represents a register from which a CPU reads the reference PCR value, 5 a register from which the CPU reads the count value B of the internal counter 2, and 6 a frequency setting value register of N bits for a voltage controlled clock oscillator. If it is assumed that the frequency drawing range is ±100 ppm and the frequency correction value of the minimum bit is 1 ppm/LSB, for example, N=8. The reference numeral 7 denotes a DA converter for converting the data of N bits set in the register into a DC voltage, 8 an amplifier for controlling the gain between the dynamic range of the voltage output from the DA converter 7 and the input variable voltage of a voltage controlled clock oscillator at the next stage, and 9 the voltage controlled clock oscillator (VCXO) for generating a system clock of a nominal frequency 27 MHz. It is necessary that the voltage controlled clock oscillator 9 has a variable frequency range not less than the frequency drawing range. The commercially available voltage controlled clock oscillator 9 generally stipulates the minimum variable frequency per unit voltage, and has the following specification, for example.

(1) Variable frequency per unit voltage: more than ±100 ppm/V (actually about ±150 ppm/V), and (2) input variable voltage range: +2.5 V±2 V. Since the input variable voltage is ±2 V and the variable frequency is ±100 ppm/V, the clock oscillator 9 can vary the frequency in the range of a little over ±200 ppm.

The reference numeral 10 denotes a central processing unit (CPU), which is composed of hardwares such as an arithmetic processor (not shown), a program memory (ROM), a data memory (RAM), and an input/output interface. The CPU 10 executes clock synchronization control by program control. The reference numeral *10a* represents a CPU clock generator, and *10b* a CPU bus.

An MPEG2 system separator (not shown) inputs a PCR value of 42 bits contained in each transport packet TPP of the received MPEG2 transport stream to the reference PCR storage portion 1 in serial bits, monitors the end of the arrival of the PCR values, and inputs a PCR arrival end signal to the operation controller 3 when it receives the last PCR bit.

The operation controller 3 then generates a latch signal, stores the PCR value in the reference PCR storage portion, and outputs the PCR value A. As a result, the PCR value A is stored in the register 4. And the latest count value B of the internal counter 2 is constantly stored in the register 5.

Thereafter, the operation controller 3 inputs the interruption signal IRQ to the CPU 10. The CPU 10 which has recognized interruption reads the PCR value which has lately arrived and the count value B of the internal counter 2 which is in progress of counting from the registers 4 and 5, respectively. Since both the precedent PCR value and the precedent count value are stored in the RAM built in the CPU 10, the CPU 10 obtains the difference ΔA between the precedent and current PCR values and the difference ΔB between the precedent and current count values (see FIG. 16). The CPU 10 also counts the CPU clock so as to obtain the time elapsed from the arrival of the precedent PCR value to the arrival of the current PCR value, thereby calculating the PCR arrival interval ΔT.

The CPU 10 then obtains the frequency deviation ΔF from the following formula:

$$\Delta F\ (ppm)=(\Delta B-\Delta A)/(\Delta T\times 27\times 10^6).$$

In other words, the value ΔF (ppm) is calculated by dividing the frequency deviation generated during 1 second by a nominal frequency 27 MHz ($=27\times10^6$ Hz).

When the frequency deviation ΔF (ppm) is obtained, the CPU 10 sets the frequency deviation ΔF in the register 6. The DA converter 7 converts the frequency data set in the register 6 into an analog voltage. If it is assumed that the register 6 has 8 bits, it is possible to set the frequency deviation in 255 stages. If it is assumed that the frequency changing unit is 1 ppm/LSB, the frequency change of about ±128 ppm is possible.

The amplifier 8 has the following gain characteristic with respect to the input value to the DA converter 7 when the variable frequency characteristic of the clock oscillator 9 is ±100 ppm/V:

(1) the output frequency of the clock oscillator 9 is 27.0 MHz at the central value 80 h (128 d), (2) the output frequency of the clock oscillator 9 is 27.0 MHz+127 ppm at the maximum value FFh (255 d), and (3) the output frequency of the clock oscillator 9 is 27.0 MHz+128 ppm at the minimum value OOh (000 d), wherein h represents hexa and d decimal.

The voltage controlled clock oscillator 9 changes the frequency in the direction in which the frequency deviation decreases on the basis of the output of the amplifier 8. The above-described control is thereafter executed whenever a PCR value arrives.

The actual frequency of a system clock changes more largely than the frequency deviation ΔF which is set in the register 6 by the CPU 10. For this reason, the frequency deviation of the system clock of the encoder and the decoder undergoes a transition (image) shown in FIG. 17, and the average frequency of the system clock of the decoder in a long time becomes synchronous with the frequency of the system clock of the encoder.

The above-described operational environment of the conventional MPEG2-TS will be summed up in the following.

(a) In the MPEG2-TS, the PCR supply interval of the encoder is only stipulated as not more than 100 ms, and the necessity of a regular interval is not demanded.

(b) The MPEG2-TS is generally used to transmit picture/voice/data, etc by using a network and the decoder is disposed at a remote place from the encoder. Therefore, a jitter generates in a signal transmission time or a transmission clock in the network, and it is necessary to widen the variable range of the system clock on the decoder side due to the jitter. For example, the frequency change of the system clock (27 MHz) in the encoder which is stipulated in the MPEG2-TS standard is within ±30 ppm, and the jitter of the line clock generated when a general digital private line is used for a network for picture transmission is about ±30 ppm. It is therefore necessary to respond to a frequency change of ±60 ppm in total, so that the necessary variable range of the frequency of the system clock on the decoder side is about 27 MHz±100 ppm including a margin.

(c) The PCR arrival interval in the decoder is calculated by counting the CPU clock during the interval of the internal interruption IRQ which generates every time the PCR arrives.

(d) In the generally commercially available voltage controlled clock oscillator of which nominal frequency is 27 MHz which is used on the decoder side, the minimum value of the frequency change per unit controlled voltage is only stipulated, and the actual frequency change is different in clock oscillators.

In the conventional system, the PCR arrival interval is counted by the software timer (count of the CPU clock), as is clear from (c). An ordinary software timer called an interval timer counts the time by accumulating the interruptions which generate at an interval of several 10 ms to several 100 ms. Since the PCR arrival interval is not more than 100 ms, as is clear from (a), an interval timer for counting a unit of about 1 ms is necessary in order to accurately count the PCR arrival interval. However, when an interval timer for counting such a short time interval is used, the number of times of interruption, namely, the number of times of processing interruption increases, so that the load of the CPU disadvantageously increases.

In addition, when the PCR arrival interval is counted by the interval timer (software timer), the recognition of interruption by the CPU and the processing time of the CPU become unstable. For this reason, in the conventional system, a large error in time is disadvantageously contained in the result of the calculation of the PCR arrival interval.

Furthermore, in the conventional system, there is no processing system for absorbing the network jitter (the jitter in the PCR arrival interval generated in the network) explained in (b).

As explained in (d), in the frequency change per unit voltage in the voltage controlled clock oscillator, only the minimum value is stipulated. For this reason, in the conventional system, even if the frequency setting value is set in the register so as to obtain an expected frequency, there is a deviation between the expected frequency and the actual output frequency of the clock oscillator, so that the frequency synchronism is not obtained (see FIG. 17).

SUMMARY OF THE INVENTION

Accordingly, it is an object of the present invention to eliminate the above-described problems in the related art and to provide a clock frequency synchronizer which is capable of accurately measuring the PCR arrival interval without using a software timer and without increasing the load of the CPU.

It is another object of the present invention to provide a clock frequency synchronizer which is capable of accurately counting the system clocks on the decoder side which generate during the PCR arrival interval, thereby accurately calculating the frequency deviation.

It is still another object of the present invention to provide a clock frequency synchronizer which is capable of securely synchronizing the frequencies of the system clocks on the encoder side and the decoder side in a short time.

It is a further object of the present invention to provide a clock frequency synchronizer which is capable of absorbing the jitter which is generated in a network in the PCR arrival interval and accurately calculating a frequency deviation and correcting the frequency of the clock oscillator on the decoder side.

It is a still further object of the present invention to provide a clock frequency synchronizer which is capable of controlling a frequency deviation to zero by setting the accurate frequency setting value corresponding to the frequency deviation in a register while taking the variable frequency range characteristic of the clock oscillator into consideration even if the characteristic is different in clock oscillators.

It is a still further object of the present invention to provide a clock frequency synchronizer which is capable of enhancing the frequency synchronism of the system clocks on the encoder side and the decoder side.

To achieve these ends, in a first aspect of the present invention, there is provided a clock frequency synchronizer for receiving a count value (PCR value) of a system clock on a encoder side which is transmitted from the encoder as a reference count value, and generating system clock on a decoder side which is synchronous in frequency with the system clock on the encoder side on the basis of the reference count value, the clock frequency synchronizer comprising: (1) a detecting means for detecting arrival of the reference count value (PCR value); (2) a system clock generator for generating the system clock on the decoder side; (3) a counting means for counting the system clocks on the decoder side; (4) an arithmetic processor for calculating a reference count value arrival interval $\Delta T$ by dividing a increment $\Delta C$ of the count value of the counting means during the reference count value arrival interval by a nominal frequency value of the system clock, and calculating the deviation of the frequency of the system clock on the decoder side from that of the system clock on the encoder side by using the increment $\Delta C$ of the count value of the counting means, an increment $\Delta P$ between the current reference count value and the precedent reference count value and the interval $\Delta T$ of the reference count value arrival time; and (5) a clock frequency controller for controlling the system clock generator on the decoder side so that the frequency deviation becomes zero.

In another aspect of the present invention, there is provided a clock frequency synchronizer for receiving a count value of system clock on a encoder side which is transmitted from the encoder as a reference count value (PCR value), and generating system clock on a decoder side which is synchronous in frequency with the system clock on the encoder side on the basis of the reference count value, the clock frequency synchronizer comprising: (1) a detecting means for detecting arrival of the reference count value; (2) a system clock generator for generating the system clock on the decoder side; (3) a counting means for counting the system clocks on the decoder side; (4) an arithmetic processor for monitoring a reference count value arrival interval $\Delta T$, calculating the deviation of the frequency of the system clock on the decoder side from that of the system clock on the encoder side by using an increment $\Delta C$ of the count value of the counting means during the reference count value arrival interval, an increment $\Delta P$ between the precedent reference count value and the current reference count value and the reference count value arrival interval $\Delta T$, storing the latest N frequency deviations including the current frequency deviation, and calculating the average of the N frequency deviations; and (5) a clock frequency controller for controlling the system clock generator so that the average frequency deviation becomes zero.

In still another aspect of the present invention, there is provided a clock frequency synchronizer for receiving a count value of system clock on an encoder side which is transmitted from the encoder as a reference count value, and generating system clock on a decoder side which is synchronous in frequency with the system clock on the encoder side on the basis of the reference count value, the clock frequency synchronizer comprising: (1) a detecting means for detecting arrival of the reference count value; (2) a system clock generator for generating the system clock on the decoder side; (3) a counting means for counting the system clocks on the decoder side; (4) an arithmetic processor for monitoring a reference count value arrival interval $\Delta T$, obtaining a increment $\Delta C$ of the count value of the counting means during the reference count value arrival interval and a increment $\Delta P$ between the precedent reference count value and the current reference count value, calculating the deviation of the frequency of the system clock on the decoder side from that of the system clock on the encoder side by dividing the difference between the increment $\Delta C$ and the increment $\Delta P$ by the reference value arrival interval $\Delta T$ and a nominal frequency value of the system clock, and determining a frequency setting value in correspondence with the frequency deviation; and (5) a clock frequency controller including a register for setting the frequency setting value and a DA converter for converting the frequency setting value which is set in the register into an analog value so as to control the system clock generator so that the frequency deviation becomes zero.

Other features and advantages of the present invention will be apparent from the following description taken in conjunction with the accompanying drawings.

BRIEF DESCRIPTION OF THE DRAWINGS

FIG. 2 is an explanatory view of the transport packet of the MPEG2-TS;

FIG. 6 shows the structure of a soft interface register;

FIG. 7 is a table showing the relationship between a frequency setting value and a frequency correction value (ppm);

FIG. 10 is a flow chart of a preliminary process (phase A) for smoothing a frequency deviation;

FIG. 13 is a flow chart of a clock frequency synchronizing process (phase B);

DESCRIPTION OF THE PREFERRED EMBODIMENTS (a) MPEG2-TS picture transmission system FIG. 1 shows the structure of an MPEG2-TS picture transmission system, wherein the upper part shows the encoder side and the lower part the decoder side. An encoder 11 and a decoder 21 are connected with each other by a network 31. The reference numeral 41 represents a camera for taking a picture, and 42 a microphone for taking sound. Both of them are provided on the encoder side. The reference numeral 43 represents a monitor for displaying a picture, and 44 a speaker for outputting sound. Both of them are provided on the decoder side.

In the encoder 11, the reference numeral 11*a* represents a picture encoder for compressing and encoding a picture, 11*b* a sound encoder for compressing and encoding sound, and 11*c* a clock oscillator for outputting a system clock of which nominal frequency is and 27 MHz used at the time of encoding a picture. The reference numeral lid represents an MPEG2 system multiplexer for multiplexing the encoded picture data, sound data, user data, etc. and transmitting them in the form of a transport packet. FIG. 2 shows the structure of an MPEG2-TS transport packet produced by the MPEG2 system multiplexer 11*d*. The MPEG2 transport stream (uppermost portion) is composed of a multiplicity of transport packets TPP, and each transport packet is composed of various information fields and a payload PLD. A PCR (indicated by slashed lines) of 42 bits is inserted into a predetermined position of an information field. The PCR value is a count value of the system clocks counted by a counter 11*e* of 42 bits. The reference numeral 11*g* denotes a framing processor for framing the transport stream by a net clock in the network 31, and 11*h* a PLL for outputting a clock signal which is synchronous with the net clock.

Figure 1:
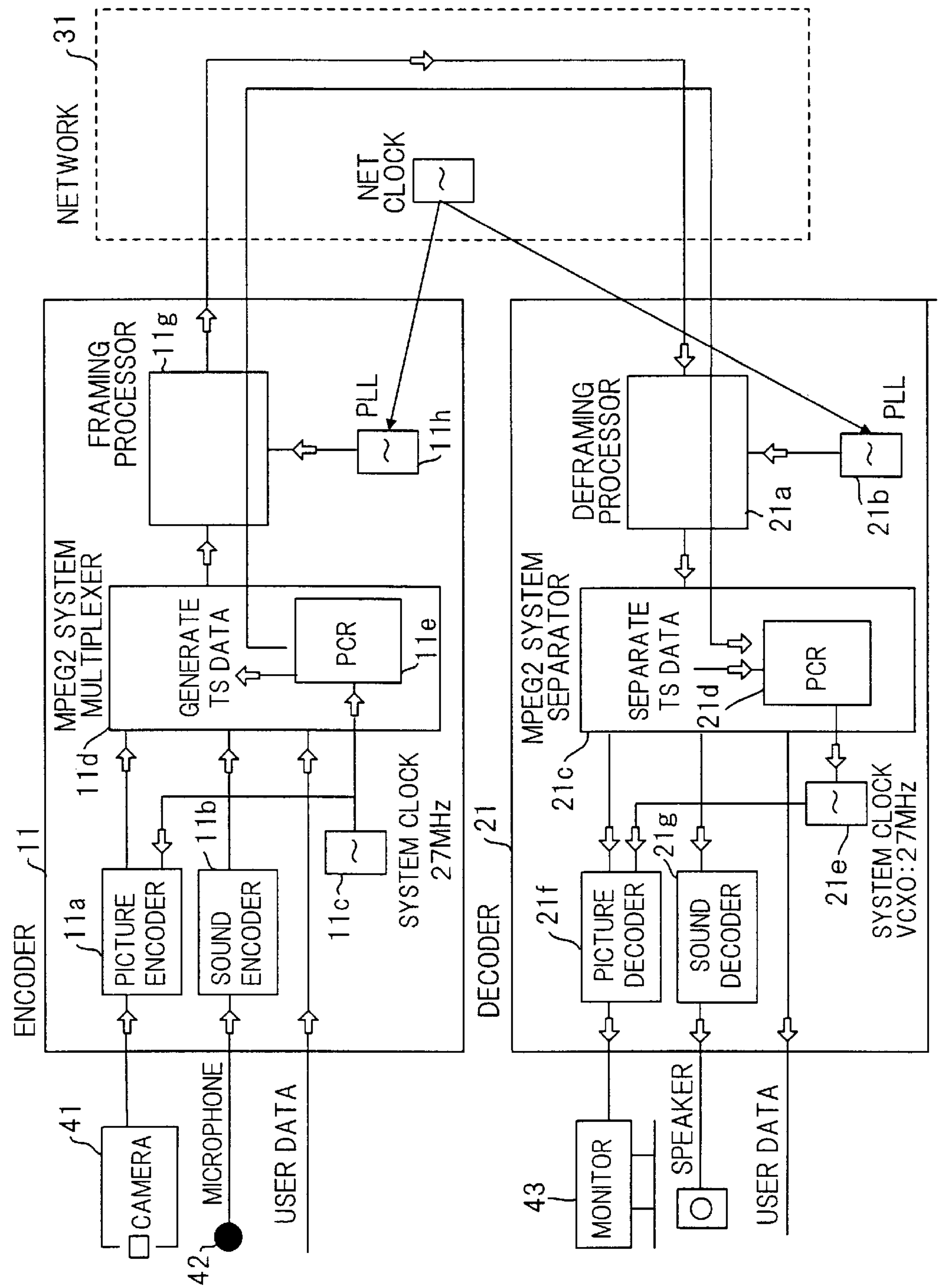
FIG. 1 shows the structure of an MPEG2-TS picture transmission system.

In the decoder 21, the reference numeral 21*a* represents a deframing processor for deframing the frame data received from the network 31 in the form of a transport stream, 21*b* a PLL for outputting a clock signal which is synchronous with the net clock, and 21*c* an MPEG2 system separator for separating the picture data, sound data and user data from the transport stream and outputting them, and also reporting the end of the PCR arrival. The reference numeral 21*d* denotes a clock frequency synchronizer according to the present invention. The clock frequency synchronizer 21*d* synchronizes the frequency of the system clock on the decoder side with the frequency of the system clock on the encoder side by using the PCR value supplied from the encoder. The reference numeral 21*e* denotes a clock oscillator for generating a system clock with the frequency controlled by the clock frequency synchronizer, 21*f* a picture decoder for decoding the encoded picture data, and 21*g* a sound decoder for decoding the encoded sound data.

(b) Clock oscillator

The clock oscillator 21*e* is of a voltage controlled type, and generates a system clock of which nominal frequency is 27 MHz. The clock oscillator 21*e* has a variable frequency range of not smaller than the frequency drawing range. The commercially available voltage controlled clock oscillator generally stipulates the minimum variable frequency per unit voltage. For example, a clock oscillator having the following specification is commercially available and it is used in the present invention:

(1) Variable frequency per unit voltage: more than ±100 ppm/V (actually about ±150 ppm/V), and (2) input variable voltage range : +2.5 V±2 V. Since the input variable voltage is ±2 V and the variable frequency is ±100 ppm/V, the clock oscillator 21*e* can vary the frequency in the range of a little over ±200 ppm.

(c) Clock frequency synchronizer

Figure 3:
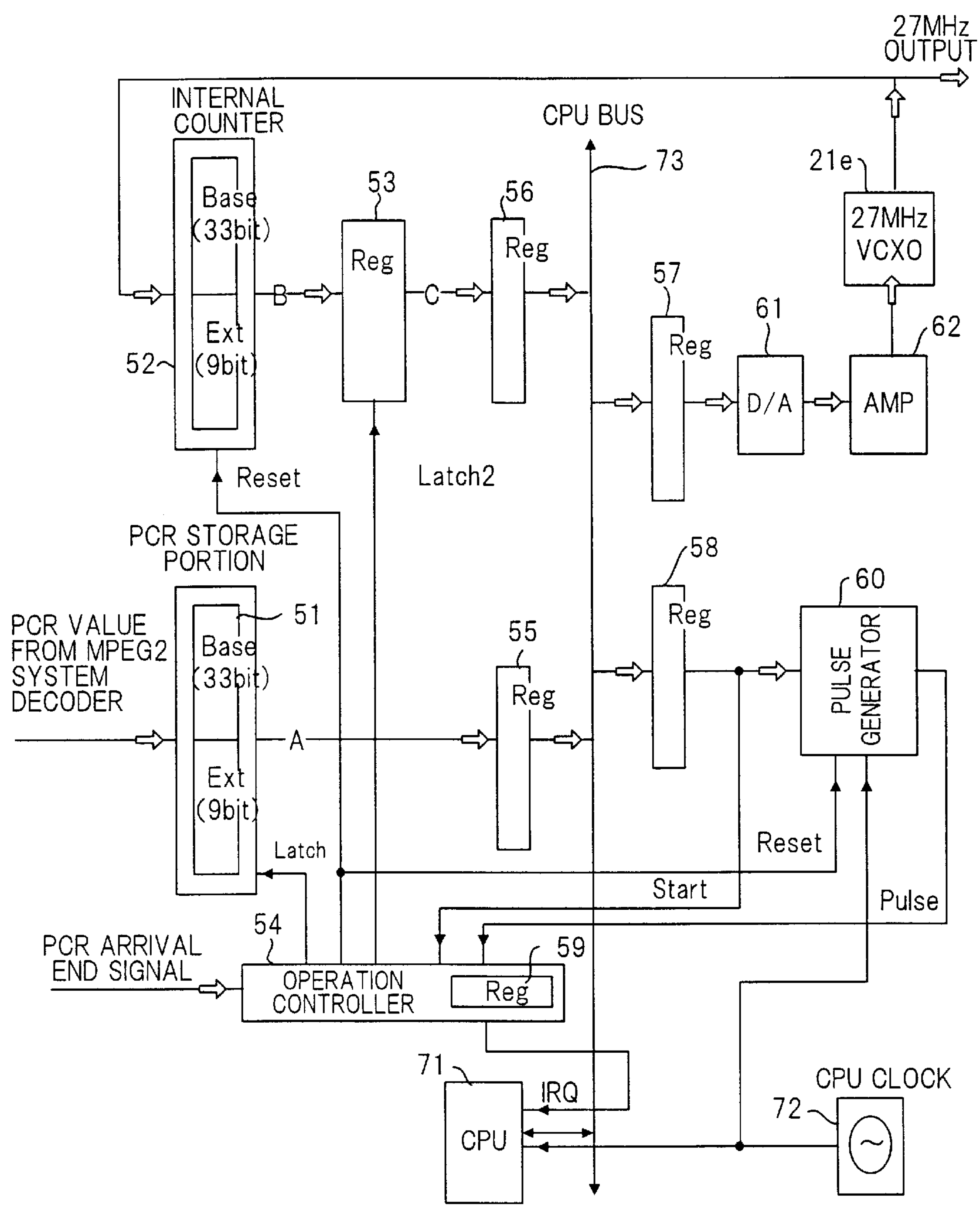
FIG. 3 shows the structure of an embodiment of a clock frequency synchronizer on the decoder side according to the present invention.
Figure 4:
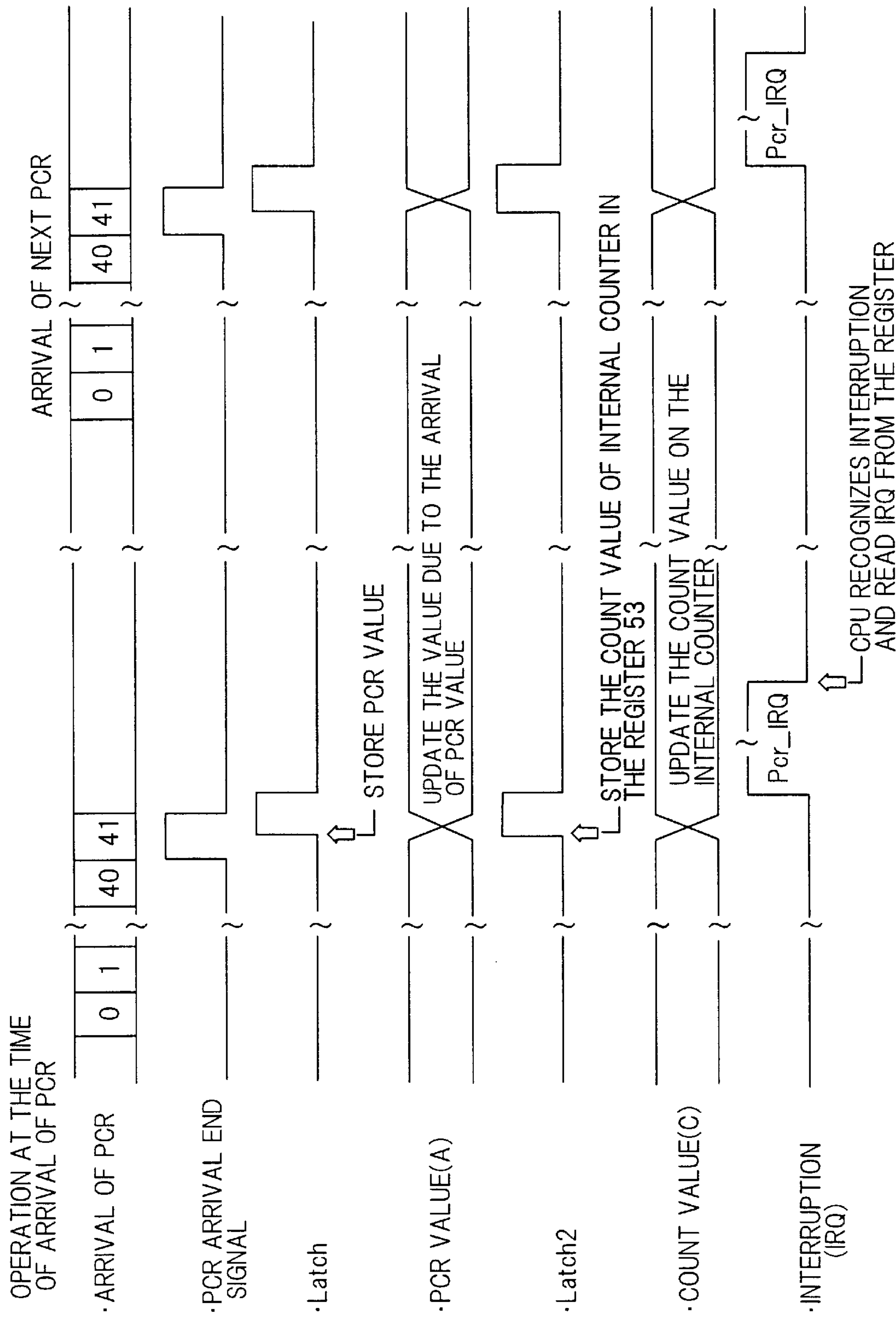
FIG. 4 is a time chart at the time of frequency synchronization control.
Figure 5:
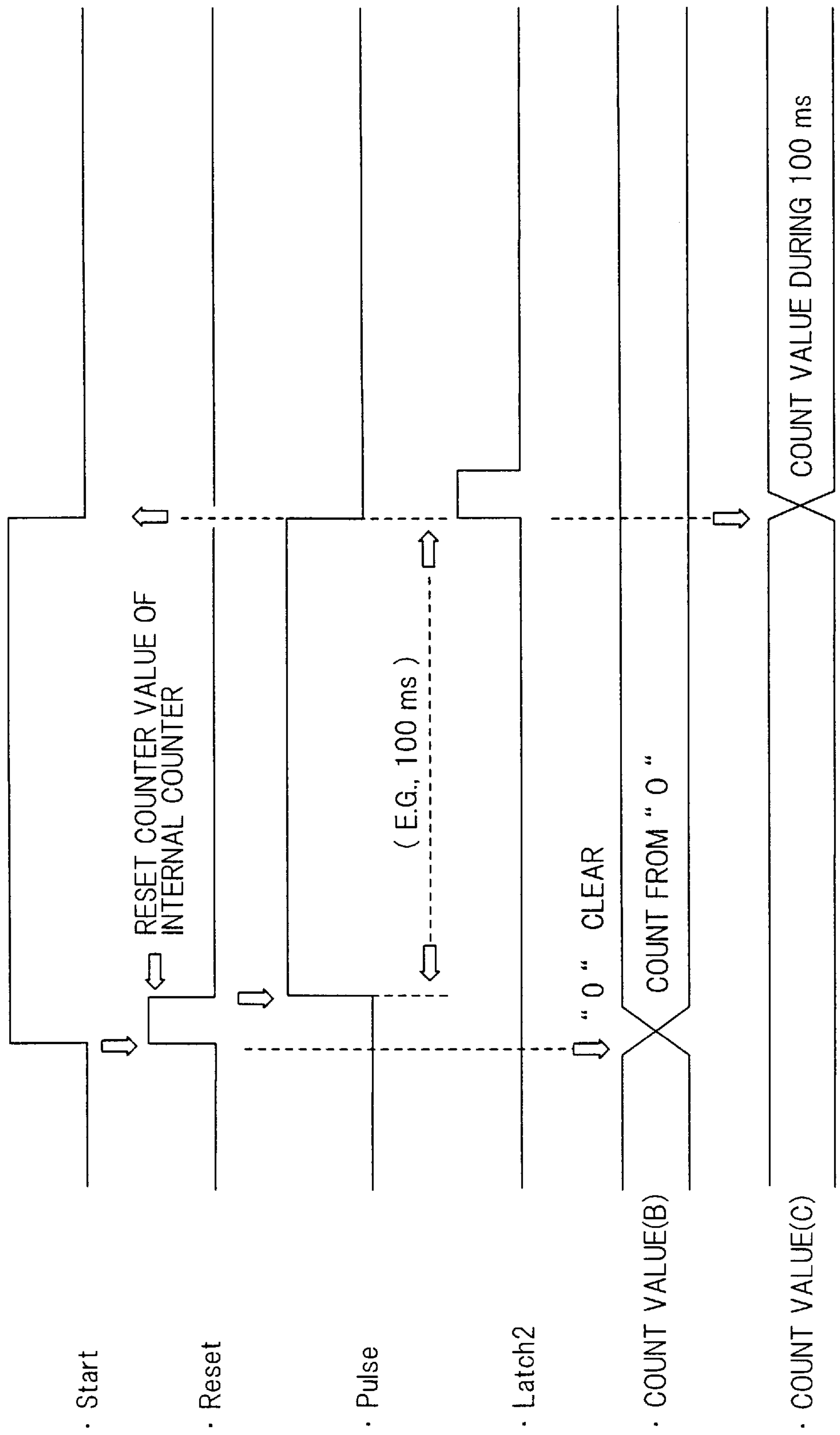
FIG. 5 is a time chart at the time of checking the characteristic of a clock oscillator.

FIG. 3 shows the structure of a clock frequency synchronizer 21*d* provided on the decoder 21, FIG. 4 is a time chart at the time of frequency synchronization control, and FIG. 5 is a time chart at the time of checking the characteristic of a clock oscillator 21*e*.

In FIG. 3, the reference numeral 51 represents a reference PCR storage portion for storing the PCR value of 42 bits which is transmitted from the encoder 11 via the MPEG2 system separator 21*c* (see FIG. 1). The reference PCR storage portion 51 is composed of a Base portion of 33 bits and an Extension portion of 9 bits, i.e, 42 bits in total. The reference numeral 52 represents an internal counter for counting the system clocks output from the clock oscillator 21*e*. The internal counter 52 is composed of a Base portion of 33 bits and an Extension portion of 9 bits, i.e, 42 bits in total. The Extension portion counts from 0 to 299, and the Base portion counts up the carry pulses from the Extension portion. The internal counter 52 is capable of counting the system clocks of 27 MHz for a little over 24 hours. The reference numeral 53 represents a register for storing the count value of the internal counter 52 when a PCR arrives.

The reference numeral 54 represents an operation controller for (1) controlling the operation at the time of controlling the frequency synchronization on the basis of the PCR supplied from the encoder 11 (see the time chart in FIG. 4), and (2) controlling the operation at the time of checking the characteristic of the clock oscillator 21*e* (VCXO of 27 MHz for the system clock) (see the time chart in FIG. 5). The operation controller 54 receives a PCR arrival end signal from the system separator 21*c* and generates latch signals Latch, Latch 2 and an interruption signal IRQ at the time of frequency synchronization control in (1). More specifically as shown in FIG. 4, (i) the operation controller 54 generates latch signals Latch and Latch 2 when the arrival of a PCR from the encoder 11 has ended, (ii) latches the reference PCR value in the reference PCR storage portion 51 in accordance with the latch signal Latch, (iii) stores the count value of the internal counter 52 in the resister 53 in accordance with the latch signal Latch 2, and thereafter (iv) generates an interruption signal IRQ. When the interruption signal IRQ is generated, a CPU executes frequency synchronization control so that the frequency deviation becomes zero.

At the time of checking the characteristic of the clock oscillator 21*e* in (2), the operation controller 54 receives a start signal Start and a pulse signal Pulse (which maintains a high level for a predetermined period, e.g., 100 ms) from a later-described pulse generator, and generates a reset signal Reset and a latch signal Latch 2. More specifically as shown in FIG. 5, the operation controller 54 (i) generates the reset signal Reset so as to reset the contents of the internal counter 52 and the internal timer of a pulse generator 60 (which will be described later) when it receives the start signal Start which indicates the start of counting the system clock, and (ii) generates the latch signal Latch 2 so as to store the number of system clocks (count value of the internal counter 52) which has generated during a predetermined time, e.g., 100 ms in the register 53 when the internal timer indicates the predetermined time 100 ms (when the pulse signal Pulse has dropped to a low level).

The reference numerals 55 to 59 denote registers for a soft interface, wherein 55 represents a register from which the CPU 71 reads the reference PCR value, 56 a register from which the CPU 71 reads the count value C of the internal counter 52 stored in the register 53, 57 a frequency setting value register in which the frequency setting value of the clock oscillator 21*e* is set, 58 a check register in which a flag (Pulse-Start) for indicating the start of counting a system clock is set by the CPU 71 at the time of checking the characteristic of the clock oscillator, and reset when the counting operation is finished, and 59 an interruption register which indicates the occurrence of interruption due to the arrival of a PCR by an interruption flag (PCR IRQ) and which is cleared by the read access of the CPU 71.

FIG. 6 shows the structure of the registers 55 to 59 for a soft interface. Both the register 55 (PCR0–PCR2) and the register 56 (CNT0–CNT2) are composed of 42 bits in total, including a Base portion of the upper 33 bits and an Extension portion of the lower 9 bits. The Extension portion of 9 bits counts from 0 to 299, and the Base portion of 33 bits counts up by one every time the count value reaches 300 and holds the count value at 90 KHz ($=27\times10^6/300$). The frequency setting value register 57 has N bits. If it is assumed that the frequency drawing range is ±100 ppm and the unit of frequency correction of the minimum bit is 1 ppm/LSB, N=8. FIG. 7 shows the relationship between the frequency correction value and the frequency setting value which is set in the frequency setting register 57. In the upper columns, a frequency setting value represented by the hexadecimal notation (0 represents a positive sign +), and a frequency correction value (ppm) is shown in the lower column.

Both the check register 58 and the interruption register 59 are composed of 16 bits, and only the uppermost 1 bit is used as a flag.

Returning to FIG. 3, the reference numeral 60 represents a pulse generator having an internal timer. The pulse generator 60, as shown in FIG. 5, (i) outputs a pulse signal Pulse of a high level when a reset signal Reset is output from the operation controller 54 at the time of checking the characteristic of the clock oscillator 21*e*, and thereafter (ii) outputs a pulse signal Pulse of a low level when the time counting is initiated by the initial timer and a predetermined time (e.g., 100 ms) is counted.

The reference numeral 61 denotes a DA converter for converting a frequency setting value of 8 bits which is set in the frequency setting value register 57 into a direct voltage, and 62 an amplifier for adjusting the gain between the dynamic range of an output voltage and the input variable voltage range of the clock oscillator 21*e* at the next stage.

The reference numeral 71 denotes a processor (CPU) which is composed of a hardware (not shown) such as an arithmetic processor, a program memory (ROM), data memory (RAM) and input/output interface, etc.. The CPU 71 executes various processes which will be explained in the following under the control of a program. More specifically, the CPU 71 executes (1) a clock oscillator characteristic checking process (CHECK process), and (2) a frequency synchronizing process (RUNNING process). The reference 72 represents a CPU clock generator and 73 a bus line.

(d) Summary of the processes executed by the CPU

The CPU 71 executes (1) a clock oscillator characteristic checking process (CHECK process), and (2) a frequency synchronizing process (RUNNING process) for making the deviation of the frequency of the system clock on the encoder side from that on the decoder side zero.

(d-1) CHECK process

Figure 17:
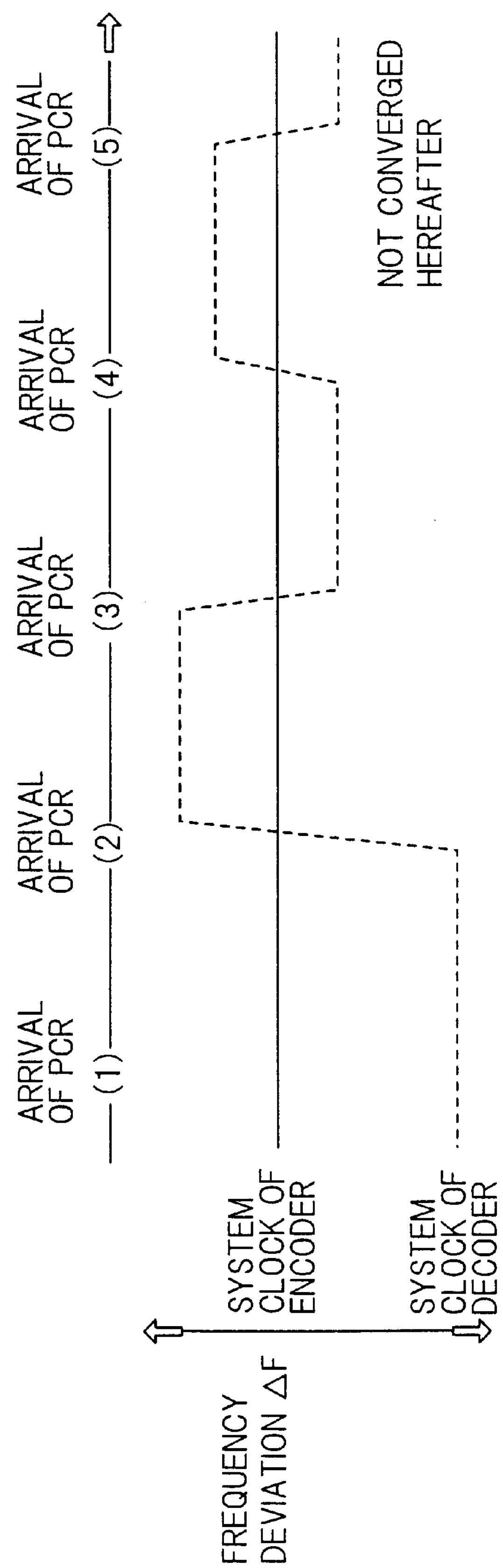
FIG. 17 is an explanatory view of a frequency deviation in a conventional method.

The reason for checking the characteristic of the clock oscillator 21*e* is as follows. In a commercially available clock oscillator, only the minimum variable frequency per unit voltage is specified. Therefore, even if a frequency setting value is set in the frequency setting value register 57 so that predetermined frequency correction value (ppm) and frequency of the system clock are obtained in accordance with FIG. 7, the clock oscillator 21*e* does not change the output frequency in such a way as expected by the CPU 71. As a result, the actual frequency of the system clock deviates from the frequency of the system clock expected by the CPU 71, and the frequency of the system clock on the decoder side does not agree with the frequency of the system clock on the encoder side in a short time, thereby lowering the frequency synchronism (see FIG. 17).

As a countermeasure, the difference between the oscillation frequency of the clock oscillator 21*e* when the minimum value (0×00 h, wherein h indicates a hexadecimal value) is set in the frequency setting value register 57 and the oscillation frequency of the clock oscillator 21*e* when the maximum value (0×FFh) is set in the frequency setting value register 57 is obtained, and the maximum variable frequency range (ppm) of the clock oscillator 21*e* is obtained on the basis of the difference. Then, ratio X of the preset maximum variable frequency (256 ppm in FIG. 7) and the actual maximum variable frequency is obtained. For example, if the actual maximum variable frequency is 384 ppm (1.5 times), the ratio X is 1/1.5 (=256/384). This means that if the value A·X which is X times larger than the conventional frequency setting value A is set in the frequency setting value register 57, it is possible to obtain an expected frequency change. For example, when the frequency correction of +64 ppm would be desirable at X=1/1.5, 192 (center value 128+64) is conventionally set in the frequency setting value register 57. In contrast, in the present invention, since X=1/1.5, (center value 128+(+64×1/1.5))=171 is set in the frequency setting value register 57.

In this manner, the characteristic of the actual clock oscillator 21*e* is checked so as to obtain the above-described ratio X.

(d-2) RUNNING PROCESS

When a network jitter occurs, the interval between the PCR values becomes unstable, so that the interval between the PCR values measured on the decoder side does not agree with the interval between the PCR values on the encoder side. Under the circumstance, it is impossible to obtain the accurate frequency deviation, which disables accurate frequency synchronization control. In order to alleviate the deleterious influence of a network jitter, the latest N frequency deviations are stored, and the average value thereof is regarded as the current frequency deviation. The frequency of the system clock on the decoder side is gradually so controlled as to make the current frequency deviation zero. In this manner, even if the PCR (reference count value) arrival interval varies by the influence of the network jitter, it is possible to reduce the influence to 1/N. That is, it is possible to smooth the momentary frequency deviation calculated under the influence of the network jitter, and to alleviate the deleterious influence thereof (smoothing process).

At the start, there are not N frequency deviations. Therefore, a preliminary process for obtaining N frequency deviations is first executed, and thereafter the substantial process for making the frequency deviation zero is executed. Owing to the preliminary process, it is possible to obtain the accurate frequency deviation thereafter and correct it.

(d-3) Entire processing of the CPU

Figure 8:
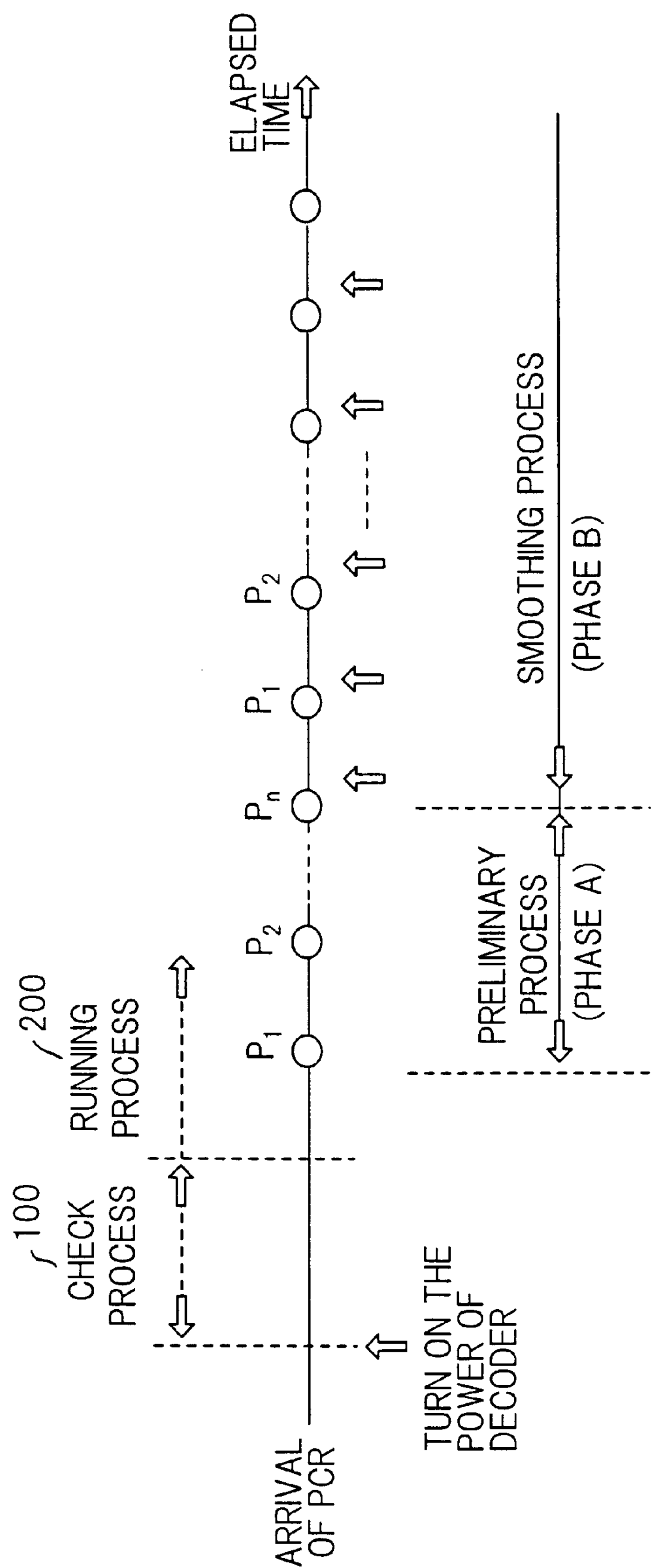
FIG. 8 is an explanatory view of the entire processing of a CPU.

FIG. 8 is an explanatory view of the entire processing of a CPU. The processing is composed of a CHECK process 100 and a RUNNING process 200. The RUNNING process 200 includes a preliminary smoothing process (phase A) and a smoothing process (phase B).

By turning on the power of the decoder, the CHECK process is started, and the RUNNING process is started after the CHECK process. In the RUNNING process, a preliminary process for obtaining N frequency deviations is first executed, and thereafter the substantial process for synchronizing the frequencies by using the average value of the latest N frequency deviations is executed. (e) Details of the processing of the CPU (e-1) Process for checking the characteristics of the clock oscillator (CHECK process)

Figure 9:
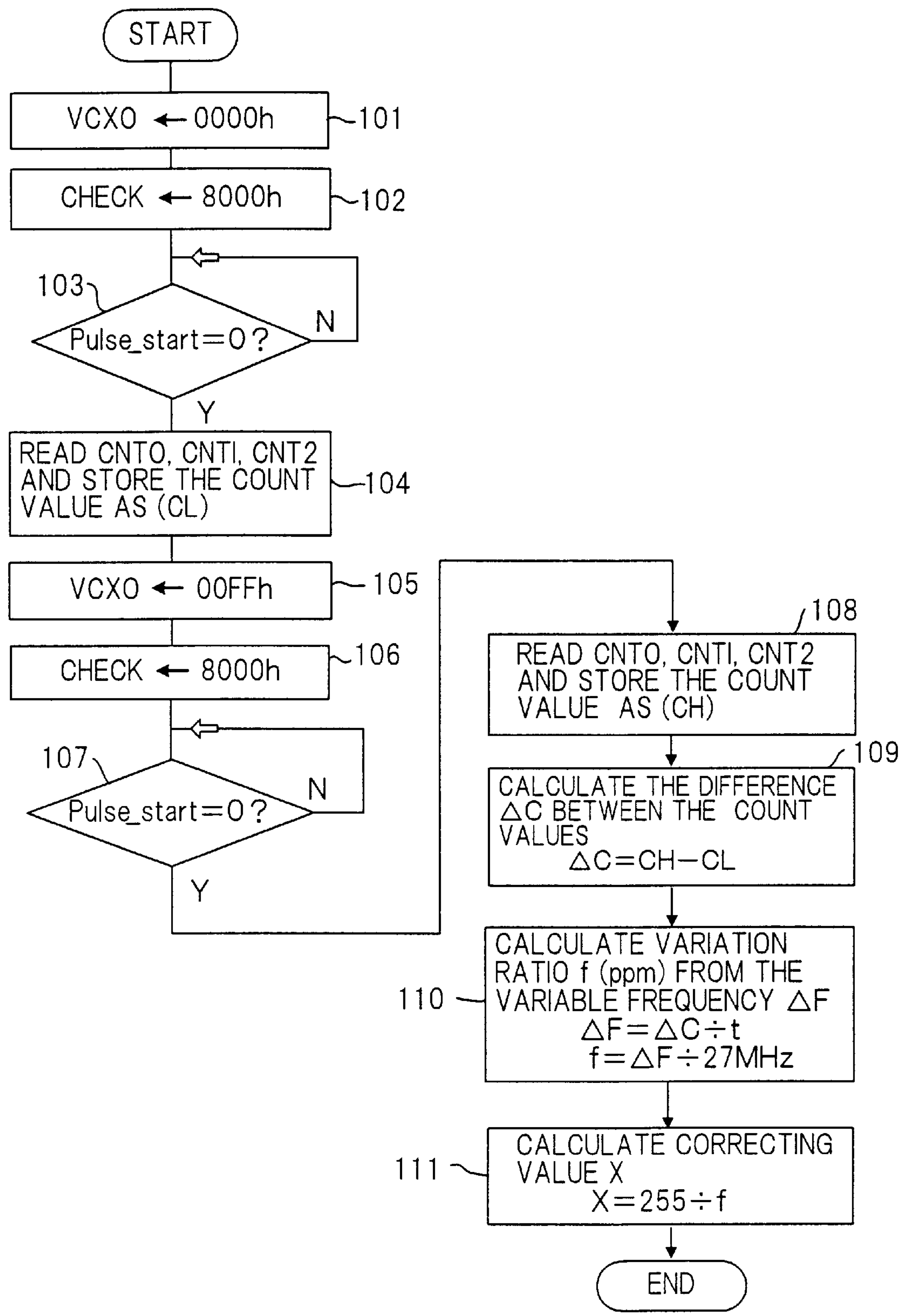
FIG. 9 is a flow chart (CHECK process) of the CPU at the time of checking the variable frequency characteristic.

FIG. 9 is a flow chart of the process (CHECK process) for checking the characteristic of the clock oscillator 21*e*. The CHECK process will be explained with reference to the hardware shown in FIG. 3 and the time chart shown in FIG. 5.

When the power of the decoder 21 is turned on, the CPU 71 sets the minimum value 0000 h (0 by the decimal notation) in the frequency setting value register 57 and sets 8000 h (the most significant bit is "1" and the other bits are "0") in the check register 58 (steps 101, 102).

The digital value set in the frequency setting value register 57 is converted into an analog value, amplified and input to the clock oscillator 21*e*. The clock oscillator 21*e* outputs a system clock of a predetermined frequency (=27 MHz−Δ ppm). When the value 8000 h (the most significant bit is "1" and the other bits are "0") is set in the check register 58, it outputs a start signal Start of a high level, and when the operation controller 54 receives the start signal Start of a high level, it outputs a reset signal Reset. The internal counter 52 thereafter clears the content to zero and starts counting the system clocks. Simultaneously with the counting, the pulse generator 60 resets the internal timer, starts clocking and also outputs a pulse signal Pulse of a high level.

The internal counter 52 continues counting the system clocks, and when the pulse generator 60 clocks 100 ms, the pulse generator 60 outputs a pulse signal Pulse of a low level. When the operation controller 54 receives a pulse signal Pulse of a low level, it supplies a latch signal Latch 2 to the register 53, which thereby stores the count value of the internal counter 52. The count value C is the number of system clocks which have been generated during 100 ms, and it is written into the soft interface register 56.

The CPU 71 checks whether or not the pulse signal Pulse has dropped to a low level (step 103), and if the pulse signal Pulse is at a low level, the CPU 71 reads the count value C written in the register 56 (CNT0, CNT1, CNT2) and stores it as CL in the RAM which is built in the CPU (step 104). In this manner, the operation of storing the number CL of system clocks which the clock oscillator 21*e* has generated during 100 msec while the clock oscillator 21*e* is oscillating at the minimum frequency is finished.

The CPU 71 then sets the maximum value 00FFh (255 by the decimal notation) in the frequency setting value register 57, and sets 8000 h (the most significant bit is "1" and the other bits are "0") in the check register 58 (steps 105, 106).

The digital value set in the frequency setting value register 57 is converted into an analog value, amplified and input to the clock oscillator 21*e*. The clock oscillator 21*e* outputs a system clock of a predetermined frequency (=27 MHz+Δppm). When the value 8000 h (the most significant bit is "1") is set in the check register 58, it outputs a start signal Start of a high level, and when the operation controller 54 receives the start signal Start of a high level, it outputs a reset signal Reset. The internal counter 52 thereafter clears the content to zero and starts counting the system clocks. Simultaneously with the counting, the pulse generator 60 resets the internal timer, starts clocking and also outputs a pulse signal Pulse of a high level. The internal counter 52 continues counting the system clocks, and when the pulse generator 60 clocks 100 ms, the pulse generator 60 outputs a pulse signal Pulse of a low level. When the operation controller 54 receives a pulse signal Pulse of a low level, it supplies a latch signal Latch 2 to the register 53, which thereby stores the count value of the internal counter 52. The count value is the number of system clocks which have been generated during 100 ms, and it is written into the soft interface register 56.

The CPU 71 checks whether or not the pulse signal Pulse has dropped to a low level (step 107), and if the pulse signal Pulse is at a low level, the CPU 71 reads the count value C written in the register 56 (CNT0, CNT1, CNT2) and stores it in the RAM as CH (step 108). In this manner, the operation of storing the number CH of system clocks which the clock oscillator 21*e* has generated during 100 msec when the clock oscillator 21*e* is oscillating at the maximum frequency is finished.

When the count values CL and CH are obtained, the CPU 71 calculates the difference ΔC between these count values from the following formula:

$$\Delta C = CH - CL \text{ (step 109)},$$

and then obtains the variable frequency range ΔF of the clock oscillator 21*e* from the following formula:

$$\Delta F = \Delta C/t, \text{ wherein } t = 100 \text{ ms}.$$

Thereafter, the maximum variable frequency range f (ppm) with respect to the nominal frequency 27 MHz is calculated from the following formula:

$$f = \Delta F/(27\times10^6) \text{ (step 110)}.$$

Finally, the ratio X of the preset maximum variable frequency range (255 (ppm) in the example shown in FIG. 7) to the actual maximum variable frequency range f (ppm) is obtained from the following formula:

$$X = 255/f \text{ (step 111)}.$$

The process (CHECK process) for checking the characteristic of the clock oscillator is thus finished.

(e-2) Preliminary process in the frequency synchronizing process (RUNNING process).

FIG. 10 is a flow chart of a preliminary process (phase A) in the frequency synchronizing process. This process will be explained with reference to the hardware shown in FIG. 3 and the time chart shown in FIG. 4.

The CPU 71 first initiates all of the number n of the stored frequency deviations, the summation value ΣF of the deviation frequencies, and the number e of times the frequency deviation exceeds the preset value in succession to zero (step 201). The CPU 71 then sets 0080 h (128 by the decimal notation) in the frequency setting value register 57 as the initial value (step 202). The digital value set in the frequency setting value register 57 is converted into an analog value and input to the clock oscillator 21*e*. The clock oscillator 21*e* oscillates at about 27 MHz. The internal counter 52 counts the system clocks output from the clock oscillator 21*e*.

Thereafter, the CPU 71 waits for the generation of an interruption signal IRQ (step 203). The MPEG2 system separator 21*c* (FIG. 1) separates the PCR value of 42 bits which is contained in each transport packet TPP received and inputs it to the PCR storage portion 51 in serial bits, and also monitors the end of the PCR arrival. When the MPEG2 system separator 21*c* receives the last PCR bit, it inputs the PCR arrival end signal to the operation controller 54. The operation controller 54 thereby generates latch signals Latch and Latch 2, and stores the PCR value in the reference PCR storage portion 51 and the count value of the internal counter 52 in the register 53. The internal counter 52 thereafter continues counting the system clocks. The reference PCR value A and the count value C stored in the reference PCR storage portion 51 and the register 53, respectively, are written in the soft interface registers 55 and 56, respectively, so that the CPU 71 can read the values.

The operation controller 54 then sets an interruption flag Pcr-IRQ in the internal interruption register 59. When the interruption flag Pcr-IRQ is set, the CPU 71 recognizes it, reads the count value C stored in the register 56 (CNT0, CNT1, CNT2) and stores it in the internal RAM as C[0] (step 204). The CPU 71 then reads the reference PCR value P stored in the register 55 (PCR0, PCR1, PCR2), stores it in the internal RAM as P[0] and resets the interruption flag Pcr-IRQ (step 205). In this manner the first reference PCR value and count value in the preliminary process are stored in the RAM.

Figure 11:
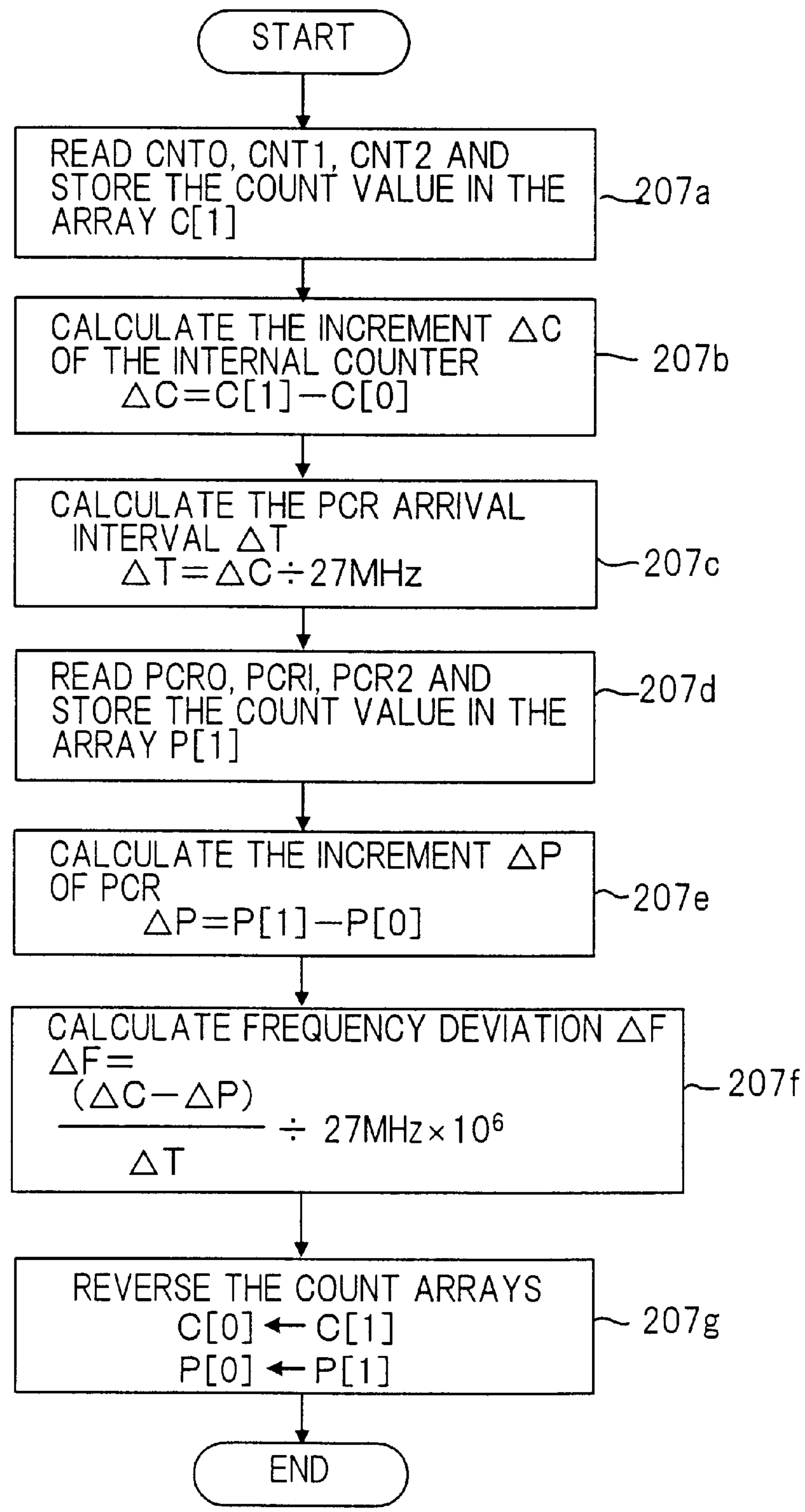
FIG. 11 shows a subroutine A for calculating a frequency deviation.

The CPU 71 then waits for the generation of an interruption signal IRQ due to the arrival of the next PCR (step 206). When the operation controller 54 receives the PCR arrival end signal, it generates latch signals Latch and Latch 2, and stores the PCR value in the reference PCR storage portion 51 and the count value of the internal counter 52 in the register 53 in the same way as described above. The internal counter 52 thereafter continues counting the system clocks. The reference PCR value A and the count value C stored in the reference PCR storage portion 51 and the register 53, respectively, are written in the soft interface registers 55 and 56, respectively, so that the CPU 71 can read the values. Thereafter, the operation controller 54 sets an interruption flag Pcr-IRQ in the internal interruption register 59. When the interruption flag Pcr-IRQ is set, the CPU 71 recognizes it, and executes a subroutine A for calculating a frequency deviation which is shown in FIG. 11 (step 207).

In the subroutine A, the CPU 71 reads the count value C stored in the register 56 (CNT0, CNT1, CNT2) and stores the count value C in the internal RAM as C[1] (step 207*a*). The CPU 71 then calculates the increment ΔC of the internal counter 52 (the number of system clocks which have been generated during the reference PCR arrival interval from the following formula:

$$\Delta C=C[1]-C[0] \text{ (step } \mathbf{207}b\text{)},$$

and then calculates the reference PCR value arrival interval ΔT from the following formula:

$$\Delta T=\Delta C/(27\times10^6) \text{ (step } \mathbf{207}c\text{)}.$$

When the CPU 71 finishes the calculation of the reference PCR value arrival interval ΔT, it reads the current reference PCR value P stored in the register 55 (PCR0, PCR1, PCR2), stores the value P in the internal RAM as P[1], and resets the interruption flag Pcr-IRQ (step 207*d*). The CPU 71 then calculates the difference ΔP (number of system clocks on the encoder side) between the current PCR value and the precedent PCR value from the following formula:

$$\Delta P=P[1]-P[0] \text{ (step } \mathbf{207}e\text{)}.$$

Thereafter, the CPU 71 obtains the frequency deviation ΔF from the following formula:

$$\Delta F\ (ppm)=(\Delta C-\Delta P)/(\Delta T\times27\times10^6)\times10^6 \text{ (step 207}f\text{)}.$$

In this manner, the frequency deviation (unit: ppm) is obtained by dividing the difference in frequency by the nominal frequency. The CPU then changes C[1] and P[1] to C[0] and P[0], respectively (step 207*g*), and the subroutine for calculating the frequency deviation is finished.

When the frequency deviation ΔF (ppm) is obtained, the CPU 71 checks whether or not the absolute value |ΔF| of the frequency deviation is not less than the preset value f (ppm) (step 208 in FIG. 10). The preset value is, for example, f (ppm)=100 (ppm).

If |ΔF|<f, the CPU 71 stores the frequency deviation ΔF obtained in the internal RAM as the n-th frequency deviation F[n] (stored in the F[n] array) (step 209). The CPU 71 then clears the number e of times the absolute value |ΔF| of the frequency deviation has reached the preset value f (ppm) in succession to 0 (step 210), advances n by one (n+1→n) (step 211) and sums n frequency deviations F[0] to F[n−1] obtained from the following formula:

$$\Sigma F=\Sigma F+\Delta F \text{ (step } \mathbf{212}\text{)}.$$

Figure 12:
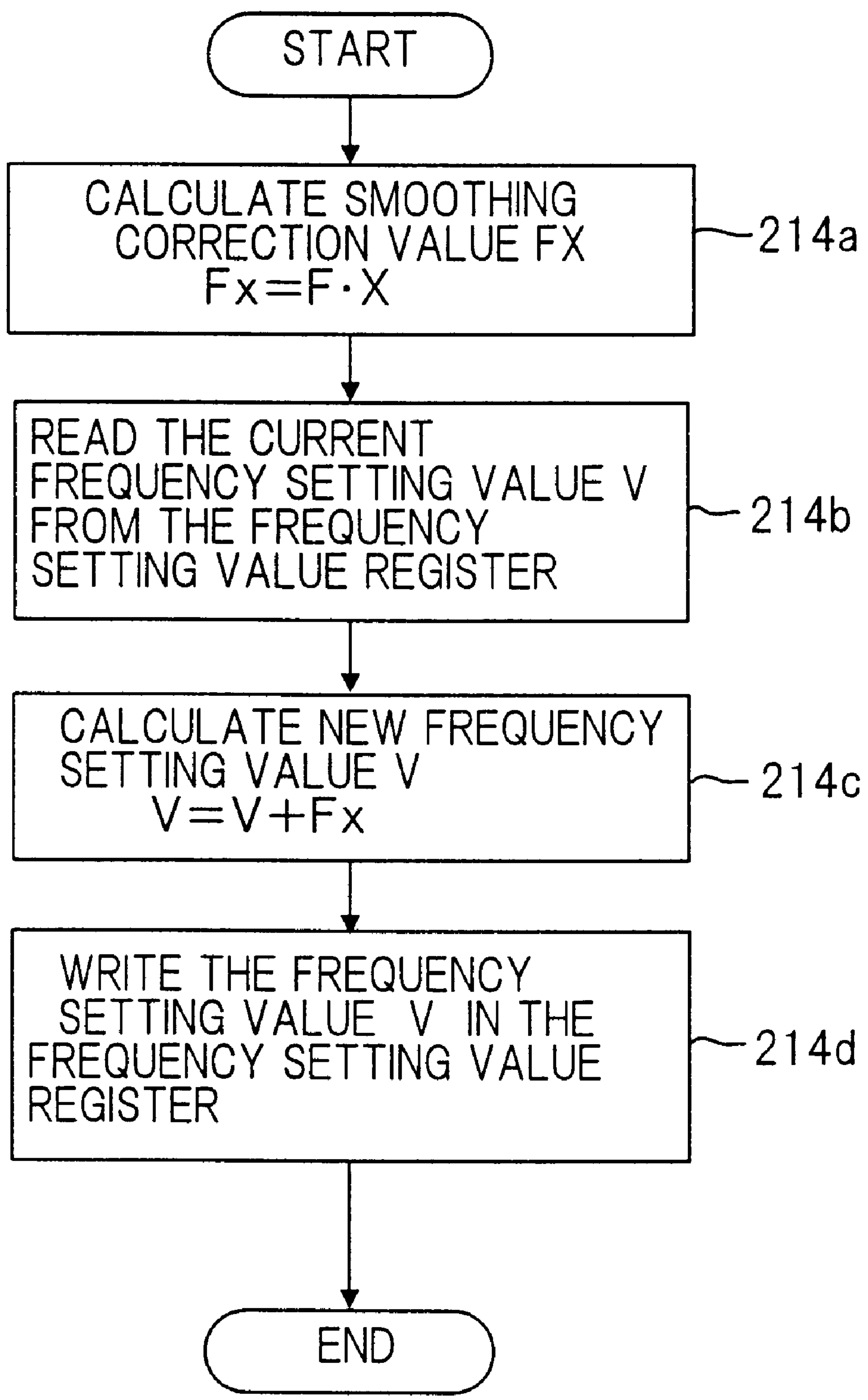
FIG. 12 shows a subroutine B for determining a frequency setting value.
Figure 14:
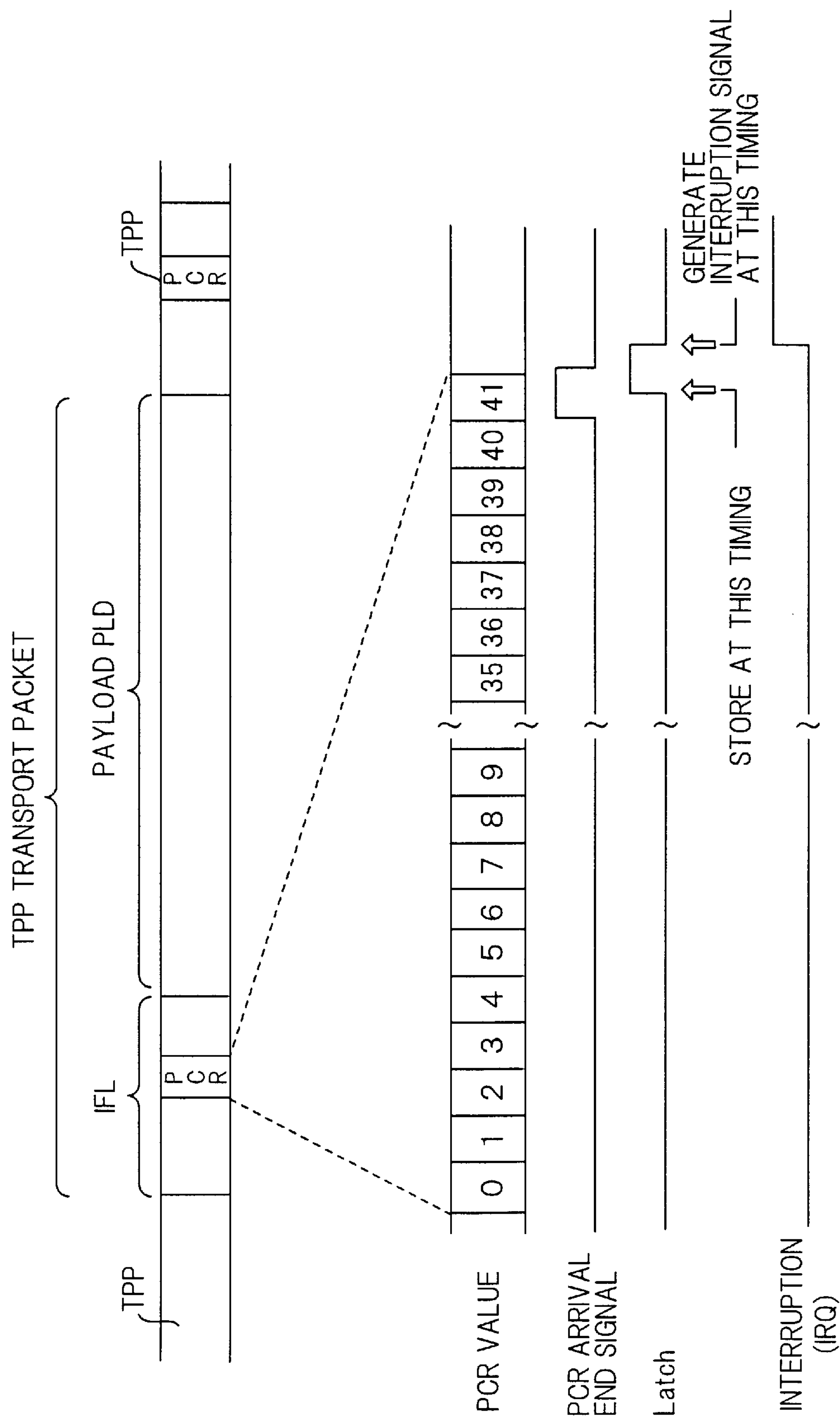
FIG. 14 shows the relationship between a PCR value and a timing of each signal.
Figure 15:
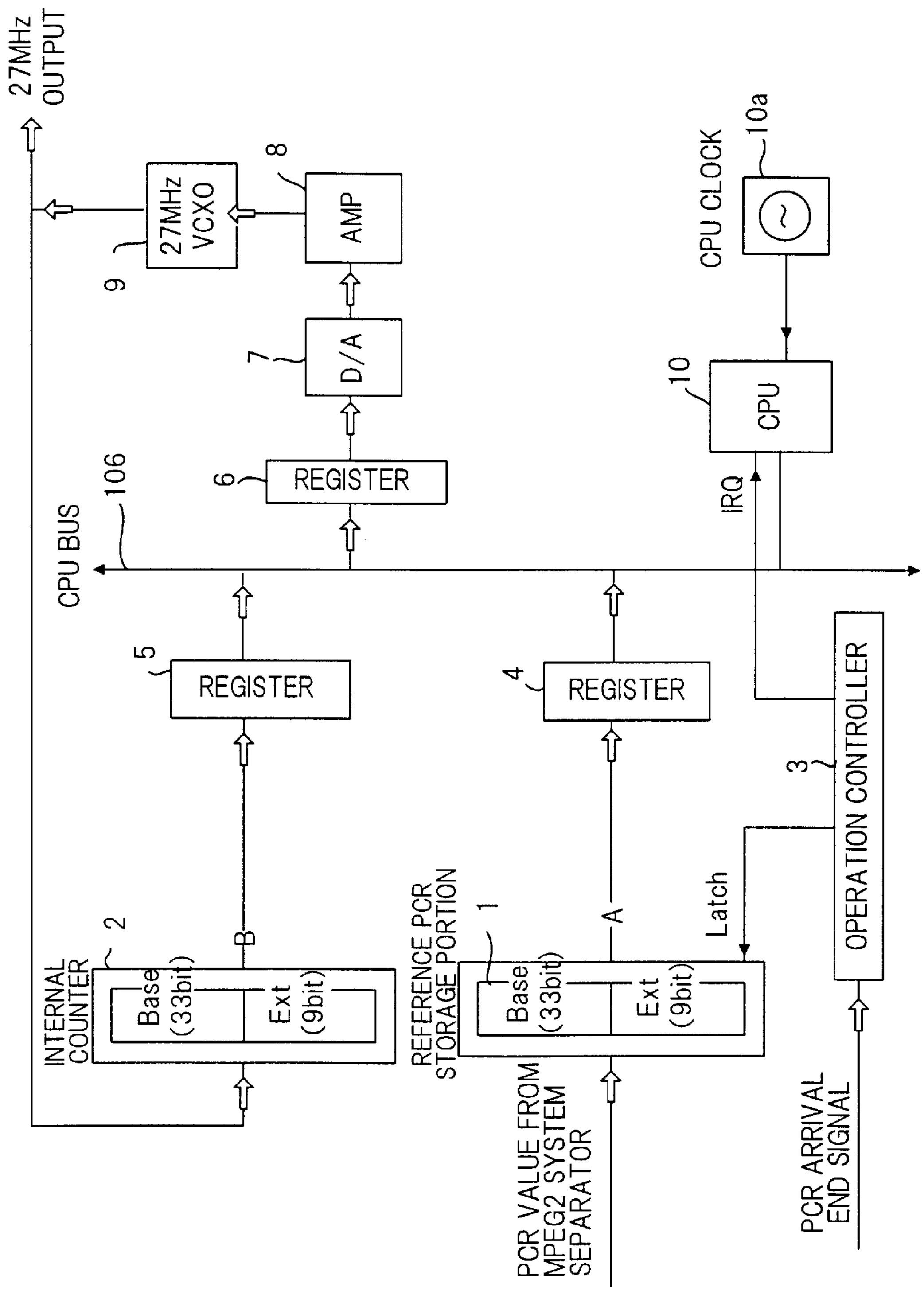
FIG. 15 shows the structure of a conventional clock frequency synchronizer on the decoder side.
Figure 16:
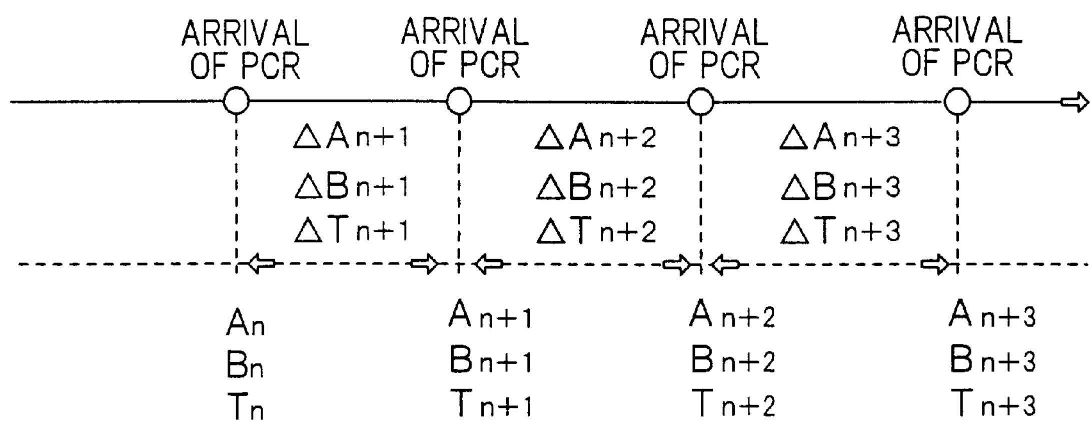
FIG. 16 is an explanatory view of the processing by a CPU.

When the summation value ΣF of the frequency deviation is obtained, the average value of n frequency deviations is obtained from the following formula:

$$F=\Sigma F/n \text{ (step } \mathbf{213}\text{)},$$

and executes a subroutine B for determining a frequency setting value shown in FIG. 12 (step 214).

In the subroutine B, the CPU 71 calculates the frequency correction value Fx from the following formula by using the ratio X which has already been obtained in the CHECK process:

$$Fx=F\cdot X \text{ (step } \mathbf{214}a\text{)}.$$

The CPU 71 then reads the current frequency setting value V set in the frequency setting value register 57 (step 214*b*), calculates a new frequency setting value V from the following formula:

$$V=V+Fx \text{ (step } \mathbf{214}c\text{)}$$

and writes the new frequency setting value V in the frequency setting value register 57 (step 214*d*). The digital value of the new frequency setting value V is converted into an analog value and input to the clock oscillator 21*e*. The clock oscillator 21*e* oscillates at the frequency corresponding to the set value.

When the subroutine B is finished in this manner, the CPU 71 checks whether or not n>N−1 (N is, for example, 64) (step 215). If n≦N−1, the CPU 71 repeats the processing from the step 206. However, if n>N−1 and N (=64) frequency deviations F[0] to F[63] are obtained, since the preliminary process is finished, n is restored to 0 (step 216). Thereafter, the CPU 71 executes the substantial frequency synchronizing process.

On the other hand, if the absolute value |ΔF| of the frequency deviation is not less than the preset value f (ppm) at the step 208, the CPU 71 does not store (discards) the frequency deviation obtained in the subroutine A, and advances the number e of times of succession by one (e+1→e) (step 221). Whether or not e>E−1 ( E is a preset number of times, for example 10) is then checked (step 222), and if e≦E−1, the processing is repeated from the step 206. However, if e>E−1, it is assumed that the state of the network has changed. The process returns to the step 201, and the preliminary process is repeated from the start.

In the above processing, a preliminary process is executed by obtaining the average value of all the frequency deviations until the N (=64) frequency deviations are obtained.

Alternatively, the following processing is possible. In this processing, the number m e.g., 8) of frequency deviations is set, and the preliminary process is executed by obtaining the average value of the latest m frequency deviations until the N frequency deviations are obtained.

(e-3) Substantial process (phase B) in the frequency synchronizing process (RUNNING process)

FIG. 13 is a flow chart of the substantial process (phase B) after the preliminary process in the frequency synchronizing process (RUNNING process). The process will be explained with reference to the hardware shown in FIG. 3 and the time chart shown in FIG. 4.

After the preliminary process (phase A) (n is 0), the CPU 71 monitors the arrival of the next PCR on the basis of the interruption IRQ (step 301). When the operation controller 54 receives the next PCR arrival end signal, it generates latch signals Latch, Latch 2, and stores the PCR value in the PCR storage portion 51 and the count value of the internal counter 52 in the register 53. The internal counter 52 thereafter continues counting the system clocks. The reference PCR value A and the count value C stored in the reference PCR storage portion 51 and the register 53, respectively, are written in the soft interface registers 55 and 56, respectively, so that the CPU 71 can read the values. Thereafter, the operation controller 54 sets an interruption flag Pcr-IRQ in the internal interruption register 59. When the interruption flag Pcr-IRQ is set, the CPU 71 recognizes it, and executes a subroutine A for calculating a frequency deviation which is shown in FIG. 11 (step 302).

When the frequency deviation $\Delta F$ (ppm) in the interval between the arrival of the precedent PCR and the arrival of the current PCR is obtained by the subroutine A, the CPU 71 checks whether or not the absolute value $|\Delta F|$ of the frequency deviation is not less than the preset value f (ppm) (step 303). The preset value is for example f (ppm)=100 (ppm).

If $|\Delta F|<f$, the CPU 71 stores the frequency deviation $\Delta F$ obtained in the internal RAM as the n-th frequency deviation F[n] (the frequency deviation $\Delta F$ is overwritten on the F[n] used in the phase A) (step 304). The CPU 71 then clears the number e of times the absolute value $|\Delta F|$ of the frequency deviation has reached the preset value f (ppm) in succession to 0 (step 305), advances n by one ($n+1\rightarrow n$) (step 306) and calculates the summation value $\Sigma F$ of the latest N (=64) frequency deviations from the following formula:

$$\Sigma F=F[0]+F[1]+F[2]+\ldots+F[N-1]$$ (step 307).

When the summation value $\Sigma F$ of the latest N (=64) frequency deviations is obtained, the average value of N frequency deviations is obtained from the following formula:

$$F=\Sigma F/N$$ (step 308), and executes a subroutine B for determining a frequency setting value shown in FIG. 12 (step 309). In the subroutine B, the CPU 71 calculates the frequency correction value Fx from the following formula by using the ratio X which has already been obtained in the CHECK process:

$$Fx=F\cdot X$$ (step 214*a*).

The CPU 71 then reads the current frequency setting value V set in the frequency setting value register 57 (step 214*b*), calculates a new frequency setting value V from the following formula:

$$V=V+Fx$$ (step 214*c*)

and writes the new frequency setting value V in the frequency setting value register 57 (step 214*d*). The digital value of the new frequency setting value V is converted into an analog value and input to the clock oscillator 21*e*. The clock oscillator 21*e* oscillates at the frequency corresponding to the setting value.

When the subroutine B is finished in this manner, the CPU 71 checks whether or not $n>N-1$ (N=64 (step 310). If $n\leqq N-1$, the CPU 71 repeats the processing from the step 301. However, if $n>N-1$ (n=64), n is initialized to zero (step 311) and the process is repeated from the step 301.

On the other hand, if the absolute value $|\Delta F|$ of the frequency deviation is not less than the preset value f (ppm) at the step 303, the CPU 71 does not store (discards) the frequency deviation obtained in the subroutine A, and advances the number e of times of succession by one ($e+1\rightarrow e$) (step 321). Whether or not $e>E-1$ (E is a preset number of times, for example 10) is then checked (step 322), and if $e\leqq E-1$, the processing is repeated from the step 301. However, if $e>E-1$ (e=E), it is assumed that the state of the network has changed, and the preliminary process (phase A) is repeated (step 323).

In the above processing, N is fixed at a constant value, but it is possible to appropriately vary the value of N in accordance with the network. For example, in a picture transmitting system using a transport stream in the ISO/IEC MPEG2 system, a high-speed digital private line is generally used, and the amount of network jitter is very slight (within ±30 ppm). The picture transmission system according to the present invention, however, is also intended to be adapted to an ATM network. In the ATM network, the jitter in the PCR arrival interval which is caused by the CDV (cell delay deviation) at the time of data transmission is much larger (about 1 ms at its maximum) than the jitter on the private line. In such a case, it is possible to adapt the picture transmission system according to the present invention to a network such as the ATM network in which the amount of jitter is large by increasing the number N of frequency deviations used for smoothing as compared in the case of a private line. For example, if the number of arrays on a private line is N=64, N is increased to 128 256, etc., in the ATM network.

Although the clock frequency synchronizer applied to the MPEG2-TS is explained in the above, the present invention is also adaptable to the other system of MPEG2, i.e., MPEG2-PS (PS: Program Stream). In the case of MPEG2-PS, SCR (System Clock Reference) is used in place of PCR as reference time information.

It is possible to execute (1) the method of determining the PCR arrival interval, (2) the method of correcting the average frequency deviation to zero, and (3) the method of determining the frequency setting value with the characteristic of the clock oscillator taken into consideration which are explained above separately from each other or in appropriate combination thereof.

As explained above, according to the present invention, since the PCR (the reference count value) arrival interval $\Delta T$ is calculated by dividing the number $\Delta C$ of system clocks generated during the reference count value arrival interval by the nominal frequency of the system clock, it is possible to accurately measure the arrival interval $\Delta T$ without using a software timer. In addition, it is possible to lessen the load of the CPU.

According to the present invention, since (1) the number of system clocks on the decoder side is counted by the counter, (2) the count value at the time of arrival of a reference count value is read and stored in the register, (3)

the deviation of the clock frequency on the decoder side from the clock frequency on the encoder side is calculated by using the difference ΔC between the count value stored in the register at the arrival of the current reference count value and the precedent count value, the increment ΔP between the current reference count value and the precedent reference count value and the reference count value arrival interval ΔT, and (4) the frequency setting value corresponding to the frequency deviation is set, even if the start of the processing of calculating a frequency deviation is delayed, the count value does not change and it is possible to accurately calculate the frequency deviation. In contrast, in a conventional method, if the start of processing of calculating a frequency deviation is delayed, the content of the counter increases during the delay, and the frequency deviation is calculated by using the increased count value, so that it is impossible to accurately calculate the frequency deviation.

According to the present invention, since the latest N frequency deviations including the current frequency deviation are stored, the average value of the N frequency deviations is calculated, and the frequency of the system clock is so controlled that the average frequency deviation becomes zero, it is possible to smooth a variation in the reference count arrival time which may be caused due to a network jitter or the like, to alleviate the deleterious influence of the jitter to 1/N and to accurately calculate the frequency deviation. More specifically, according to the present invention, it is possible to smooth the momentary frequency deviation calculated by the influence of the network jitter which is caused during transmission via a network, and to alleviate the deleterious influence thereof. On the decoder side, various timing signals for reproducing a picture and sound are generated in accordance with a system clock. The smoothing process is capable of suppressing the momentary frequency deviation of a system clock and eliminating the problem of color deviation, the blurring of a picture, noise and the like caused by jitters of various timing signals due to the momentary frequency deviation.

According to the present invention, before N frequency deviations are stored, the frequency synchronizing process is executed by using the stored frequency deviations, and a preliminary process is also executed until the N frequency deviations are stored. After the N frequency deviations are stored, the frequency synchronizing process is executed by using the latest N frequency deviations. It is therefore possible to obtain the accurate frequency deviation and correct the frequency.

According to the present invention, when the frequency deviation obtained is larger than the preset value, the frequency deviation is not stored but discarded, so that it is possible to obtain the accurate frequency deviation while disregarding the influence of a temporary large jitter.

According to the present invention, when the frequency deviations are successively larger than the preset value, it is considered that the N frequency values stored are not suitable to the current state of the network, and the preliminary process is executed again. It is therefore possible to hold N frequency deviations suitable to the current state of the network and, hence, the accurate frequency synchronization control is enabled.

According to the present invention, when the arrival of the reference count value is ended due to a trouble on a line or the like, it is possible to hold new N deviation frequencies suitable to the current state of the network by executing the preliminary process again and, hence, the accurate frequency synchronization control is enabled.

According to the present invention, since (1) the number of system clocks generated by the clock oscillator during a predetermined time T when the minimum value is set in the frequency setting value register and the number of system clocks generated by the clock oscillator during a predetermined time T when the maximum value is set in the frequency setting value register are obtained, (2) the value obtained by dividing the difference between both numbers of system clocks by the time T and the nominal frequency of the system clock is assumed as the actual maximum variable frequency of the clock oscillator, (3) the ratio X of the actual maximum variable frequency to a preset maximum variable frequency is obtained and stored, and (4) the frequency setting value is obtained by multiplying the frequency deviation by the ratio X and set in the register, even if the variable frequency range is different in clock oscillators, it is possible to control the frequency so that the frequency deviation becomes zero by setting the accurate frequency setting value corresponding to the frequency deviation in the register while taking the variable frequency range of the corresponding clock oscillator into consideration, and thus, to enhance the frequency synchronism of the system clocks on the encoder side and the decoder side.

As many apparently widely different embodiments of the present invention can be made without departing from the spirit and scope thereof, it is to be understood that the invention is not limited to the specific embodiments thereof except as defined in the appended claims.

What is claimed is:

1. A clock frequency synchronizer for receiving a count value of system clock on an encoder side which is transmitted from the encoder as a reference count value, and generating system clock on a decoder side which is synchronous in frequency with the system clock on the encoder side on the basis of the reference count value, said clock frequency synchronizer comprising:

a detecting means for detecting arrival of said reference count value;

a system clock generator for generating said system clock on said decoder side;

a counting means for counting said system clocks on said decoder side;

an arithmetic processor for calculating a reference count value arrival interval ΔT by dividing an increment ΔC of the count value of said counting means during said reference count value arrival interval by the frequency of the system clock, and calculating the deviation of the frequency of said system clock on said decoder side from that of said system clock on said encoder side by using said increment ΔC of the count value of said counting means, an increment ΔP between the current reference count value and the precedent reference count value and said reference count value arrival interval ΔT; and a clock frequency controller for controlling said system clock generator on said decoder side so that the frequency deviation becomes zero.

2. A clock frequency synchronizer according to claim 1, wherein said counting means includes a counter for counting said system clocks on said decoder side, and a first register for storing the count value of said counter when said reference count value arrives;

said arithmetic processor includes: (1) a second register for storing the current reference count value transmitted; (2) a holding portion for holding the precedent reference count value and the precedent count value of said counter; and (3) an arithmetic processing unit for calculating the deviation of the frequency of said system clock on said decoder side from that of said system clock on said encoder side by using the increment $\Delta C$ between said count value stored in said first register and said precedent count value, the increment $\Delta P$ between said current reference count value stored in said second register and said precedent reference count value and said reference count value arrival interval $\Delta T$, and determining a frequency setting value so that said frequency deviation is controlled to becomes zero;

said clock frequency controller includes a frequency setting value register in which said frequency setting value is set, and a DA converter for converting said frequency setting value set in said frequency setting value register into an analog value; and said system clock generator changes the oscillation frequency of said system clock in the direction in which said frequency deviation reduces on the basis of the output signal value of said DA converter.

3. A clock frequency synchronizer according to claim 2, wherein said arithmetic processing unit calculates said frequency deviation by dividing the difference between said $\Delta C$ and $\Delta P$ by said arrival interval $\Delta T$ and the frequency of said system clock.

4. A clock frequency synchronizer according to claim 3, wherein said arithmetic processing unit (1) obtains the number of system clocks generated by said system clock generator during a predetermined time T when a minimum value is set in said frequency setting value register and the number of system clocks generated by said system clock generator during said predetermined time T when a maximum value is set in said frequency setting value register; (2) regards the value obtained by dividing the difference between both numbers of system clocks by said time T and the frequency of said system clock as an actual maximum variable frequency of said system clock generator; (3) computes and stores the ratio X of said actual maximum variable frequency to a preset maximum variable frequency; and (4) obtains said frequency setting value by multiplying said frequency deviation by said ratio X and sets said frequency setting value in said frequency setting value register.

5. A clock frequency synchronizer according to claim 3, wherein said arithmetic processing unit (1) obtains the number of system clocks generated by said system clock generator during a predetermined time T when a minimum value is set in said frequency setting value register and the number of system clocks generated by said system clock generator during said predetermined time T when a maximum value is set in said frequency setting value register; (2) regards the value obtained by dividing the difference between both numbers of system clocks by said time T and the frequency of said system clock as an actual maximum variable frequency of said system clock generator; (3) computes and stores the ratio X of said actual maximum variable frequency to a preset maximum variable frequency; (4) obtains and stores the latest N frequency deviations including the current frequency deviation; and (5) obtains said frequency setting value by multiplying the average value of said N frequency deviations by said ratio X and sets said frequency setting value in a frequency setting value register.

6. A clock frequency synchronizer according to claim 3, wherein the number of bits of said frequency setting value register is determined so that if it is assumed that the maximum variable frequency range for said system clock generator of said decoder is ±A (ppm) and the frequency change resolution per minimum bit of said frequency setting value register is a (ppm), 2A/a can be set.

7. A clock frequency synchronizer for receiving a count value of system clock on an encoder side which is transmitted from the encoder as a reference count value, and generating system clock on a decoder side which is synchronous in frequency with the system clock on the encoder side on the basis of the reference count value, said clock frequency synchronizer comprising:

a detecting means for detecting arrival of said reference count value;

a system clock generator for generating said system clock on said decoder side;

a counting means for counting said system clocks on said decoder side;

an arithmetic processor for monitoring a reference count value arrival interval $\Delta T$, calculating the deviation of the frequency of said system clock on said decoder side from that of said system clock on said encoder side by using an increment $\Delta C$ of the count value of said counting means during said reference count value arrival interval, an increment $\Delta P$ between the current reference count value and the precedent reference count value and said reference count value arrival interval $\Delta T$, storing the latest N frequency deviations including the current frequency deviation, and calculating the average of said latest N frequency deviations; and a clock frequency controller for controlling said system clock generator so that the average frequency deviation becomes zero.

8. A clock frequency synchronizer according to claim 7, wherein said arithmetic processor executes a preliminary process for controlling average frequency deviation of the stored frequency deviations to be zero before said N frequency deviations are stored, and executes the substantial process for controlling said average frequency deviation of said latest N frequency deviations to be zero after said N number of frequency deviations have been stored.

9. A clock frequency synchronizer according to claim 7, wherein said arithmetic processor discards a frequency deviation when said frequency deviation is larger than a preset value.

10. A clock frequency synchronizer according to claim 9, wherein said arithmetic processor resets all the stored frequency deviations when the number of times of successive discard reaches a preset number of times, and thereafter resumes said preliminary process.

11. A clock frequency synchronizer according to claim 9, wherein said arithmetic processor resets all the stored frequency deviations when the arrival of said reference count value has ended in the substantial process, and thereafter executed said preliminary process again.

12. A clock frequency synchronizer for receiving a count value of system clock on an encoder side which is transmitted from the encoder as a reference count value, and generating system clock on a decoder side which is synchronous in frequency with the system clock on the encoder side on the basis of the reference count value, said clock frequency synchronizer comprising:

a detecting means for detecting arrival of said reference count value;

a system clock generator for generating said system clock on said decoder side;

a counting means for counting said system clocks on said decoder side;

an arithmetic processor for monitoring a reference count value arrival interval ΔT, obtaining an increment ΔC of the count value of said counting means during said reference count value arrival interval and an increment ΔP between the precedent reference count value and the current reference count value, calculating the frequency deviation on the decoder side from that on the encoder side by dividing the difference between said increment ΔC and said increment ΔP by said reference count value arrival interval ΔT and the frequency of the system clock, and determining a frequency setting value in correspondence with said frequency deviation; and a clock frequency controller including a register for setting said frequency setting value and a DA converter for converting said frequency setting value which is set in said register into an analog value so as to control said system clock generator so that said frequency deviation becomes zero, wherein said arithmetic processor (1) obtains the number of system clocks generated by said system clock generator during a predetermined time T when a minimum value is set in said frequency setting value register and the number of system clocks generated by said system clock generator during said predetermined time T when a maximum value is set in said frequency setting value register, (2) regards the value obtained by dividing the difference between both numbers of system clocks by said time T and the frequency of said system clock as the actual maximum variable frequency of said system clock generator, (3) computes and stores the ratio X of said actual maximum variable frequency to a preset maximum variable frequency and (4) determines said frequency setting value by multiplying said frequency deviation by said ratio X and sets said frequency setting value in said frequency setting value register.

* * * * *